(12) United States Patent
Miura

(10) Patent No.: US 7,501,225 B2
(45) Date of Patent: Mar. 10, 2009

(54) STRUCTURE AND METHOD FOR MANUFACTURING THEREOF, MEDIUM FOR FORMING STRUCTURE, AND OPTICAL RECORDING MEDIUM AND METHOD FOR REPRODUCING THEREOF

(75) Inventor: Hiroshi Miura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 11/449,766

(22) Filed: Jun. 9, 2006

(65) Prior Publication Data
US 2006/0269872 A1 Nov. 30, 2006

Related U.S. Application Data

(63) Continuation of application No. PCT/JP04/18317, filed on Dec. 8, 2004.

(30) Foreign Application Priority Data

| Dec. 9, 2003 | (JP) | ............................. 2003-410876 |
| May 18, 2004 | (JP) | ............................. 2004-148442 |

(51) Int. Cl.
*G11B 7/24* (2006.01)
(52) U.S. Cl. .................. 430/270.12; 430/945; 369/286; 428/64.9
(58) Field of Classification Search ........................ None
See application file for complete search history.

(56) References Cited

U.S. PATENT DOCUMENTS

| 3,988,720 | A | * | 10/1976 | Ovshinsky ................... 365/113 |
| 4,525,412 | A | | 6/1985 | Nakane et al. |
| 4,568,952 | A | | 2/1986 | Gittleman et al. |
| 4,645,712 | A | | 2/1987 | Ishigaki et al. |
| 5,098,761 | A | * | 3/1992 | Watanabe et al. .......... 428/64.5 |
| 5,304,455 | A | * | 4/1994 | van Liempd ............ 430/270.18 |
| 2004/0241589 | A1 | * | 12/2004 | Ito et al. ...................... 430/321 |
| 2004/0241598 | A1 | * | 12/2004 | Suga et al. ................... 430/434 |
| 2005/0106508 | A1 | * | 5/2005 | Shintani et al. .............. 430/322 |

FOREIGN PATENT DOCUMENTS

EP        0 083 994 A2     7/1983

(Continued)

OTHER PUBLICATIONS

Japanese Office Action for Application No. JP 2003-410876 (Jul. 8, 2008).

*Primary Examiner*—Martin J Angebranndt
*Assistant Examiner*—Anna L Verderame
(74) *Attorney, Agent, or Firm*—Dickstein Shapiro LLP

(57) ABSTRACT

An object of the present invention is to provide a method for manufacturing structure in which a medium for forming structure contains a stacked composition of a light absorption layer and a thermal reaction layer, and microscopic structures are formed uniformly by separating the light absorption layer which generates heat by light absorption and the thermal reaction layer which reacts with heat to form structures. Therefore, provided is a method for manufacturing structure containing light irradiation to a medium for forming structure having a stacked composition containing a light absorption layer which contains a light absorption material, and a thermal reaction layer which contains a thermal reaction material, and etching the medium for forming structure which is irradiated with light.

5 Claims, 21 Drawing Sheets

FOREIGN PATENT DOCUMENTS

| | | | |
|---|---|---|---|
| JP | 59-207433 | | 11/1984 |
| JP | 61-092447 | | 5/1986 |
| JP | 030113745 | * | 5/1991 |
| JP | 06-267112 | | 9/1994 |
| JP | 07-029184 A | | 1/1995 |
| JP | 09-115190 A | | 5/1997 |
| JP | 10-097738 | * | 4/1998 |
| JP | 10-097738 A | | 4/1998 |
| JP | 11-328738 A | | 11/1999 |
| JP | 2001-126255 A | | 5/2001 |
| JP | 2001-250279 A | | 9/2001 |
| JP | 2001-250280 A | | 9/2001 |
| JP | 2001-256646 | | 9/2001 |
| JP | 2001-344833 A | | 12/2001 |
| JP | 2002-208180 | | 7/2002 |
| JP | 2002-365806 | * | 12/2002 |
| JP | 2002-365806 A | | 12/2002 |
| JP | 2003-051437 A | | 2/2003 |
| JP | 2003-145941 A | | 5/2003 |
| JP | 2003-168244 A | | 6/2003 |
| JP | 2003-233932 A | | 8/2003 |
| WO | WO 2004/038502 | * | 5/2004 |

* cited by examiner

Track Direction

Track Direction

US 7,501,225 B2

STRUCTURE AND METHOD FOR MANUFACTURING THEREOF, MEDIUM FOR FORMING STRUCTURE, AND OPTICAL RECORDING MEDIUM AND METHOD FOR REPRODUCING THEREOF

CROSS-REFERENCE TO RELATED APPLICATIONS

This is a continuation of Application No. PCT/JP2004/018317, filed on Dec. 8, 2004.

BACKGROUND OF THE INVENTION

1. Field of the Invention

The present invention relates to a method for manufacturing structure, a medium for forming structure used for the method for manufacturing structure, structures obtained by the method for manufacturing structure, and an optical recording medium which performs recording and reproducing by the structures (concavity and convexity patterns) and a method for reproducing the optical recording medium.

2. Description of the Related Art

In recent years, reproduction-only optical recording media (herein after, may be referred to as "ROM disc") composed of microscopic structures are widely spread for use with DVD-ROM being mainly focused. And the development of blue-laser, high-density ROM discs is being rushed.

The ROM disc is for recorded information by relief patterns of concavity and convexity and generally manufactured through a complicated process including master preparation, stamper preparation and replication steps.

A master is prepared by the procedures of (1) photoresist exposure by laser beams or electron beams, (2) pattern forming by resist development and (3) substrate etching using a resist as mask in the master preparation step.

A stamper is prepared by the procedures of (1) nickel (Ni) plating on the master and (2) Ni separation in the stamper preparation step.

A predetermined concave-convex pattern is transferred to a resin material using the stamper as mold in the replication step.

Further, a test recording (authoring) is performed for the purpose of confirming and adjusting recording condition, compression efficiency and coding, etc. in manufacturing process of ROM disc. There is a limitation on the use of ROM disc which has been manufactured through all steps of the manufacturing process of ROM disc for authoring in terms of cost. Therefore, a recording medium having a recording layer which contains phase-change materials or organic dyes is used as a medium for test recording (herein after, may be referred to as "medium for authoring") in order to easily confirm authoring, etc. This kind of medium for authoring is disclosed in Japanese Patent Application Laid-Open (JP-A) Nos. 11-328738 and 2001-126255, for example.

Meanwhile, the optical recording media which perform recording of information by existing relief patterns of concavity and convexity have a problem of difficulty in microscopic concavity and convexity transferring with higher densities. To settle the problem, a mastering technique by electron-beam printing of high density is proposed in JP-A Nos. 2001-344833 and 2003-051437.

However, resist sensitivity relative to the electron beam is unsatisfactory in the electron-beam printing and since it is a process in vaccum, degradation of throughput is inevitable. Furthermore, an electron-beam printing apparatus is very expensive and a huge initial investment is needed. Moreover, throughput is degraded because of difficulty in maintenance and more running cost compared to the laser-beam exposure. Therefore, a problem arises such that the process cost rises sharply because of increase in initial investment and running cost, etc.

As a measure to settle the problem of rising process cost with micronization, a method for forming microscopic concave-convex patterns by laser beam has been developed, for example. This is a method to form patterns by disposing a thermally transformable layer, transforming a region which is smaller than the beam diameter, and removing untransformed region by etching.

For example, a method for forming concave-convex patterns (structures) by crystallizing a phase-change film such as GeSn, etc. by laser beam irradiation, and removing amorphous region by etching is proposed in JP-A No. 9-115190. Moreover, a method in which a thin auxiliary film is formed first and a groove is formed on the film once by etching and then a phase-change film formed afterward is processed by etching again is disclosed. Furthermore, a method for forming concave-convex patterns (structures) by crystallizing chalcogen compound such as GeSbTeSn by laser beam irradiation and removing amorphous region by etching is disclosed in JP-A No. 10-97738.

However, in order to form structures with appropriate uniformity on a substrate of large area such as optical discs, it is required to have large etching rate difference (etching selectivity) between regions forming structures and other regions. In the case of phase-change material, etching selectivity between crystalline state and noncrystal state (amorphous state) is small. And also, intermediate state between crystalline state and amorphous state may be formed. Therefore, it is difficult to uniformly form microscopic structures on a medium of large area by the methods disclosed in JP-A Nos. 9-115190 and 10-97738. Moreover, the manufacturing method which requires etching step twice as disclosed in JP-A No. 9-115190 has a drawback of causing a process cost rise.

Further, a method for forming structures by forming a reaction region (reaction region becomes an alloy of two metallic materials) through interdiffusion of two metallic materials by irradiating a laser beam to a thermosensitive material which is composed of stacked two metallic materials such as Al/Cu and by removing unreacted region by etching is disclosed in JP-A Nos. 2001-250279 and 2001-250280.

Moreover, a method for forming structures by forming a reaction region through interdiffusion of two materials by irradiating a laser beam to a stacked composition containing two inorganic materials such as Au/Sn and removing unreacted region by etching is disclosed in JP-A No. 2003-145941.

However, it is difficult to uniformly form microscopic structures on a medium of large area by these methods because thickness distribution of interdiffusing two materials directly becomes a composition distribution of regions forming structures, and the etching rate varies if the composition is different.

Further, a method in which a laser beam is irradiated to a stacked composition of a light absorption, heat transfer layer such as GeSbTe, etc. and a thermosensitive layer made up of chemically-amplified resist used for photolithography to transform the thermosensitive layer and untransformed region is removed by etching to form structures is proposed in JP-A No. 2002-365806.

However, materials forming the structures in JP-A No. 2002-365806 are light absorption materials and the method in which the light absorption material is used as a structure-forming material is not suitable for forming structures of high aspect ratio (height of pattern/size of structure). In other words, in the case of forming structures of high aspect ratio, a layer forming structures is needed to be thick, however, thick layer prevent micronization because heat is spread through the layer.

Therefore, a method for manufacturing structure which can form microscopic structures inexpensively by a simple process without using photolithography, and an optical recording medium having the structures uniformly on the medium of large area have not been provided and their prompt provision is desired in current condition.

SUMMARY OF THE INVENTION

The purpose of the present invention is to provide a method for forming structures, which can form microscopic structures inexpensively by a simple process without using photolithography by having a medium for forming structure which contains a stacked composition of a light absorption layer and a thermal reaction layer, and by separating the light absorption layer which generates heat by light absorption and the thermal reaction layer forming structures by thermal reaction, and a medium for forming structure used for the method for manufacturing structure and structures obtained by the method for manufacturing structure in order to settle existing issues and to fulfill the demand.

Also provided by the present invention is a high-density optical recording medium which can perform recording of information with concave-convex patterns (structures) of high density formed without degrading throughput and is favorably used as a medium for authoring.

The purpose of the present invention also includes a provision of a method for reproducing information using the optical recording medium of the present invention.

As a result of a dedicated investigation by the present inventors to settle above issues, it was found that it is possible to form microscopic structures inexpensively by a simple process without using photolithography, and in particular, it is possible to form microscopic structures uniformly on a medium of large area by having a medium for forming structure which contains a stacked composition of a light absorption layer and a thermal reaction layer, and by separating the light absorption layer which generates heat by light absorption and the thermal reaction layer forming structures by thermal reaction.

Moreover, it was also found that the present invention preferably enables to (1) form more microscopic structures by irradiating a light without substrates, (2) form structures of high aspect ratio (height of structure/size of structure) as well as to form microscopic structures uniformly on a medium of large area by using a specified material for the thermal reaction layer, (3) form microscopic structures by an inexpensive process without using vacuum apparatus with high throughput by means of wet etching, (4) form microscopic structures by an inexpensive process and apparatus by using a laser beam as a light and a semiconductor laser as a laser source, and (5) form microscopic structures on a medium of large area at high speeds by rotating the medium when a laser beam is irradiated to a medium for forming structure.

The present invention is based on the knowledge of the present inventors and the means to settle above issues are as follows.

<1> A medium for forming structure containing a light absorption layer; and a thermal reaction layer, wherein the light absorption layer and the thermal reaction layer make up a stacked composition, and the light absorption layer contains a light absorption material and the thermal reaction layer contains a thermal reaction material.

<2> The medium for forming structure as stated in above <1>, wherein the thermal reaction layer is disposed as an uppermost layer of the stacked composition, and contains a material having a transparency in wavelength of irradiated light.

<3> The medium for forming structure as stated in above <1>, wherein the thermal reaction layer contains a mixture of material A and material B, the material A is a silicon compound material and the material B is at least one selected from sulfide material, selenide material and fluorine compound material.

It is possible to form microscopic structures uniformly on the medium for forming structure as stated in the above <1> to <3>, by having a stacked composition of a light absorption layer and a thermal reaction layer and by separating the light absorption layer which generates heat by light absorption and the thermal reaction layer forming structures by thermal reaction.

<4> A method for manufacturing structure containing light irradiation to a medium for forming structure containing a stacked composition containing a light absorption layer which contains a light absorption material, and a thermal reaction layer which contains a thermal reaction material, and etching the medium for forming structure which is irradiated with light.

By the method for manufacturing structure of the present invention, it is possible to form microscopic structures inexpensively by a simple process without using photolithography by light irradiation and etching. In particular, it is possible to form microscopic structures uniformly because a layer which absorbs heat and generates heat can be thinned and the thin layer can suppress heat diffusion by having a stacked composition of a light absorption layer and a thermal reaction layer and by separating the light absorption layer which generates heat by light absorption and the thermal reaction layer forming structures by thermal reaction.

<5> The method for manufacturing structure as stated in above <4>, wherein the thermal reaction layer is disposed as an uppermost layer of the stacked composition, and contains a material having a transparency in wavelength of irradiated light. In the method for manufacturing structure as stated in above <5>, the thermal reaction layer is placed as an uppermost layer of the stacked composition and formed of a material which transmits light and at the same time, a light is irradiated from the uppermost layer, the thermal reaction layer side in light irradiation. By using the material having high transparency for the thermal reaction layer, suppressing light absorption in the thermal reaction layer is possible, and the structures can be micronized because the structures are formed by heat generated only from the light absorption layer. Moreover, micronization of the structures is also possible because NA of objective lens can be increased to focus a laser beam by irradiating a light without substrates as a surface injection.

<6> The method for manufacturing structure as stated in above <4>, wherein the thermal reaction layer contains a mixture of material A and material B, the material A is a silicon compound material and the material B is at least one selected from sulfide material, selenide material and fluorine compound material. By the method for manufacturing structure as stated above <6>, it is possible to form microscopic structures uniformly on a medium of large area because a specified material is used for the thermal reaction layer, enabling to increase etching selectivity between light-irradiated region and non-irradiated region. Further, the structures of high aspect ratio (height of structure/size of structure) can be formed because the material can be easily thickened.

<7> The method for manufacturing structure as stated in above <4>, wherein the light is irradiated from the uppermost layer, the thermal reaction layer side in the light irradiation.

<8> The method for manufacturing structure as stated in above <4>, wherein the light irradiated in the light irradiation is a laser beam.

<9> The method for manufacturing structure as stated in above <8>, wherein a source of the laser beam is a semiconductor laser.

<10> The method for manufacturing structure as stated in above <9>, wherein a laser beam irradiation apparatus, equipped with a semiconductor laser beam irradiation unit configured to irradiate a laser beam to the medium for forming structure, a laser beam modulation unit and a medium driving unit, is employed.

By the method for manufacturing structure as stated in any one of above <9> and <10>, it is possible to form microscopic structures by inexpensive process and equipment by using a semiconductor laser as a laser source.

<11> The method for manufacturing structure as stated in above <8>, wherein the medium is rotated when a laser beam is irradiated to the medium for forming structure.

<12> The method for manufacturing structure as stated in above <11>, wherein a laser beam irradiation apparatus, equipped with a laser beam irradiation unit configured to irradiate a laser beam to the medium for forming structure, a laser beam modulation unit, a medium rotation unit and a signal detecting unit, is employed.

By the method for manufacturing structure as stated in one of above <11> and <12>, it is possible to form microscopic structures on a medium of large area at high speeds to reduce the process cost by rotating the medium for forming structure when irradiating a laser beam to the medium for forming structure.

<13> The method for manufacturing structures as stated in above <4>, wherein the etching is performed by a wet etching method. By the method for manufacturing structure as stated in above <13>, it is possible to form microscopic structures by an inexpensive process without using vacuum apparatuses and with high throughput by using a wet etching method.

<14> A structure obtained by the method for manufacturing structure containing light irradiation to a medium for forming structure having a stacked composition containing a light absorption layer which contains a light absorption material, and a thermal reaction layer which contains a thermal reaction material, and etching the medium for forming structure which is irradiated with light.

<15> The structure as stated in above <14>, wherein an edge shape of a cross-section of the structure is any one of approximate vertical shape and/or approximate inverse tapered shape.

<16> The structure as stated in above <14>, wherein the structure is a convex structure formed on the surface of an optical recording medium.

<17> An optical recording medium containing a substrate; a light absorption layer; and a convex structure, wherein the light absorption layer and the convex structure are disposed on the substrate, the light absorption layer generates heat by light absorption and the convex structure is in contact with the light absorption layer and contains a different material than that of the light absorption layer, and the convex structure is formed by the method for manufacturing structure containing light irradiation to a medium for forming structure having a stacked composition containing a light absorption layer which contains a light absorption material, and a thermal reaction layer which contains a thermal reaction material, and etching the medium for forming structure which is irradiated with light. With regard to the optical recording medium as stated in above <17>, it is possible to provide a high-density optical recording medium which can perform recording of information with concave-convex patterns (structures) of high density, which is formed without degrading throughput and is favorably used as a medium for authoring.

<18> An optical recording medium containing a substrate; a light absorption layer; a convex structure; and an optical transmission layer, wherein the light absorption layer and the convex structure are disposed on the substrate, the light absorption layer generates heat by light absorption, the convex structure is in contact with the light absorption layer and contains a different material than that of the light absorption layer, and the optical transmission layer is disposed on the convex structure and contains an optical transparency to light, the optical transmission layer is applied on the surface of the convex structures and formed in approximate hemispheric form and the convex structure is formed by the method for manufacturing structure containing light irradiation to a medium for forming structure having a stacked composition containing a light absorption layer which contains a light absorption material, and a thermal reaction layer which contains a thermal reaction material, and etching the medium for forming structure which is irradiated with light. With regard to the optical recording medium as stated in above <18>, it is possible to provide a high-density optical recording medium which can perform recording of information with concavity and convexity of high density formed without degrading throughput and is favorably used as a medium for authoring.

<19> The optical recording medium as stated in above <17>, wherein the convex structure is in approximate columnar form.

<20> The optical recording medium as stated in above <17>, wherein the convex structure is in approximate cylindrical form and a diameter of the convex structure changes according to recorded information.

<21> The optical recording medium as stated in above <17>, wherein the convex structure is in approximate cylindrical form and is arranged to trigonal symmetry on the surface of the optical recording medium.

<22> The optical recording medium as stated in above <17>, wherein a track line without the convex structure is disposed every "n" track lines where "n" represents an integer of 2 or more in a radius direction of the optical recording medium.

<23> The optical recording medium as stated in above <17>, wherein the light absorption layer contains at least one type of element selected from Sb, Te and In.

<24> The optical recording medium as stated in above <17>, wherein the convex structure contains a mixture of material A and material B, the material A is a silicon compound material and the material B is at least one selected from sulfide material, selenide material and fluorine compound material.

<25> The optical recording medium as stated in above <24>, wherein the convex structure contains a mixture of ZnS and $SiO_2$.

<26> The optical recording medium as stated in above <17>, wherein a buffer layer is disposed between the substrate and the light absorption layer.

<27> A method for reproducing optical recording medium containing detecting a reflected light amount by irradiating a reproducing light to a light absorption layer and a convex structure of an optical recording medium from the convex structure side, wherein the optical recording medium contains the light absorption layer and the convex structure disposed on the substrate, and the light absorption layer generates heat by absorption of reproducing light and the convex structure is in contact with the light absorption layer and contains a different material than that of the light absorption layer.

<28> A method for reproducing optical recording medium containing detecting a reflected light amount by irradiating a reproducing light to a stacked composition containing a light absorption layer, a convex structure and an optical transmission layer of an optical recording medium, wherein the optical recording medium contains the light absorption layer, the convex structure disposed on a substrate and the optical transmission layer disposed on the convex structure, the light absorption layer generates heat by absorption of reproducing light, the convex structure is in contact with the light absorption layer and contains a different material than that of the light absorption layer, and the optical transmission layer is applied on the surface of the convex structure and formed in approximate hemispheric form, and contains an optical transparency to reproducing light.

<29> The method for reproducing optical recording medium as stated in above <27>, wherein the convex structure is in approximate columnar form.

<30> The method for reproducing optical recording medium as stated in above <27>, wherein the convex structure is in approximate cylindrical form, and a diameter of the convex structure changes according to recorded information.

<31> The method for reproducing optical recording medium as stated in above <27>, wherein the convex structure is in approximate cylindrical form and is arranged to trigonal symmetry on the surface of the optical recording medium.

<32> The method for reproducing optical recording medium as stated in above <27>, wherein multiple track lines are reproduced simultaneously by irradiation of reproducing light to the convex structure and reflected light amount is detected according to the convex structure cycle.

<33> The method for reproducing optical recording medium as stated in above <27>, wherein a track line without the convex structure is disposed every "n" track lines where "n" represents an integer of 2 or more in a radius direction of the optical recording medium.

<34> The method for reproducing optical recording medium as stated in above <33>, wherein n−1 track lines are reproduced simultaneously and reflected light amount is detected.

DESCRIPTION OF THE PREFERRED EMBODIMENTS (Structures and Method for Manufacturing thereof, and Structures)

The method for manufacturing structure of the present invention includes light irradiation and etching and further includes other steps as necessary.

The medium for forming structure of the present invention is used for the method for manufacturing structure of the present invention, and at least contains a stacked composition of a light absorption layer and a thermal reaction layer and further contains other layers as necessary.

The structures of the present invention are manufactured by the method for manufacturing structure of the present invention.

Herein below, details of the medium for forming structure of the present invention, and the structures of the present invention will be disclosed through the explanation of the method for manufacturing structure of the present invention.

The medium for forming structure at least contains a stacked composition of a light absorption layer and a thermal reaction layer. The light absorption layer has a function to generate heat by absorbing irradiated light. And the thermal reaction layer has a function to thermally react by the heat generated from the light absorption layer.

The light absorption layer generates heat by light irradiation to the medium for forming structure and induces thermal reaction of the thermal reaction layer. The light absorption layer and the thermal reaction layer may thermally react together by light irradiation. The embodiments of thermal reaction include changes in material density, crystalline state, composition and surface roughness. A number of embodiment changes may occur by thermal reaction. For example, increase in material density and changes in material composition may take place simultaneously by thermal reaction.

The layer composition of the medium for forming structure is not particularly limited as long as a stacked composition of light absorption layer and thermal reaction layer is contained, and may be selected accordingly and examples include the following layer composition of the medium for forming structure.

Figure 1:
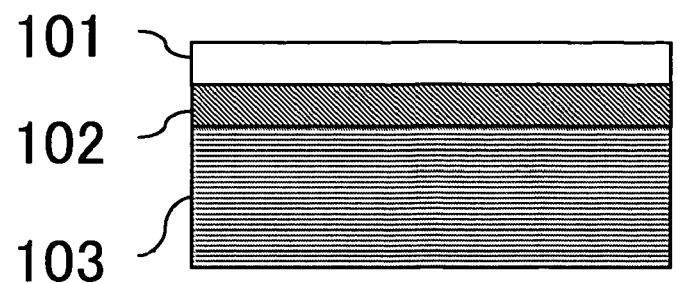
FIG. 1 shows an exemplary medium for forming structure of the present invention which has a stacked composition of a substrate, a light absorption layer and a thermal reaction layer in this order.

A medium for forming structure having a stacked composition of a substrate 103, a light absorption layer 102 and a thermal reaction layer 101 in this order as shown in FIG. 1 may be included as a medium composition 1.

Figure 2:
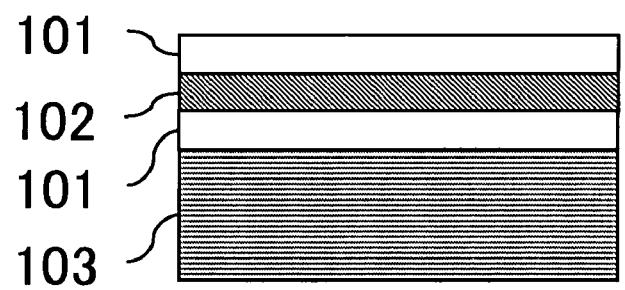
FIG. 2 shows an exemplary medium for forming structure of the present invention which has a stacked composition of a substrate, a thermal reaction layer, a light absorption layer and a thermal reaction layer in this order.

A medium for forming structure having a stacked composition of a substrate 103, a thermal reaction layer 101, a light absorption layer 102 and a thermal reaction layer 101 in this order as shown in FIG. 2 may be included as a medium composition 2.

Figure 3:
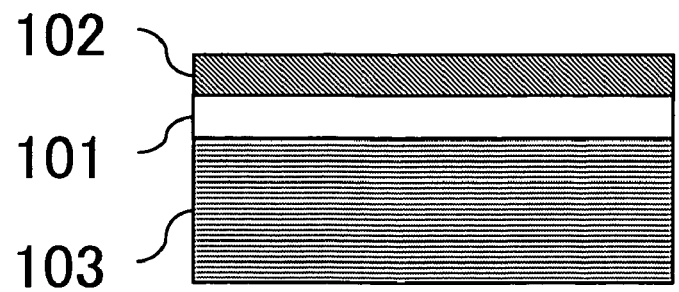
FIG. 3 shows an exemplary medium for forming structure of the present invention which has a stacked composition of a substrate, a thermal reaction layer and a light absorption layer in this order.

A medium for forming structure having a stacked composition of a substrate 103, a thermal reaction layer 101 and a light absorption layer 102 in this order as shown in FIG. 3 may be included as a medium composition 3.

-Thermal Reaction Layer-

The material of the thermal reaction layer 101 is not particularly limited as long as it is a material which changes by heat generated from the light absorption layer 102, and may be selected accordingly. A material which has low density or is in amorphous phase after formation is preferable and examples include silicon compound material, sulfide material, selenide material and fluorine compound.

Examples of the silicon compound material include $SiO_2$, SiON and $Si_3N_4$. The material density of these materials changes by the generated heat from the light absorption layer with light irradiation, and light-irradiated region becomes dense. In etching, the etching rate of light-irradiated region is lowered with densification of the material. As a result, light-irradiated region remains as structures.

Examples of the sulfide material include ZnS, CaS and BaS. The material density of these materials changes by heat generated from the light absorption layer with light irradiation, and light-irradiated region becomes dense. And the sulfur is dissociated and the material composition is changed in the light-irradiated region. In etching, the etching rate of laser-irradiated region is lowered with densification of the material and changes in the material composition. As a result, light-irradiated region remains as structures.

Examples of selenide material include ZnSe and BaSe. The material density of these materials changes by heat generated from the light absorption layer with light irradiation, and light-irradiated region becomes dense. And the selenium is dissociated and the material composition is changed in the light-irradiated region. In etching, the etching rate of light-irradiated region is lowered with densification of the material and changes in the material composition. As a result, light-irradiated region remains as structures.

Examples of the fluorine compound material include $CaF_2$ and $BaF_2$. The material density of these materials changes by heat generated from the light absorption layer with light irradiation, and light-irradiated region becomes dense. And the fluorine is dissociated and the material composition is changed in the light-irradiated region. In etching, the etching rate of light-irradiated region is lowered with densification of the material and changes in the material composition. As a result, light-irradiated region remains as structures.

The thermal reaction layer contains a mixture of material A and material B, and the material A is a silicon compound material, and the material B is preferably at least one selected from sulfide material, selenide material and fluorine compound material.

Examples of the silicon compound material of the material A include $SiO_2$, SiON and $Si_3N_4$.

Examples of the sulfide material of the material B include ZnS, CaS and BaS.

Examples of the selenide material include ZnSe and BaSe.

Examples of the fluorine compound material include $CaF_2$ and $BaF_2$.

A single material or multiple materials may be used for these materials A and B.

As for the mixing ratio of the material A and the material B, preferable range is 10 mol % to 30 mol % for the material A and 90 mol % to 70 mol % for the material B.

In the stage of film forming, it is preferable that there is no chemical binding between the materials A and B, and each exists independently.

In the method for manufacturing structure of the present invention, thickness of the thermal reaction layer corresponds to the height of the structures. Therefore, the thickness of the thermal reaction layer is set at the height of forming structures.

The method for forming the thermal reaction layer is not particularly limited and may be selected accordingly and it is preferably sputtering. Of the sputtering, RF sputtering is particularly preferable because a film is formed at room temperatures.

The sputtering target used for the sputtering is preferably a target prepared by sintering method. In a condition of sputtering target, it is preferable that there is no chemical binding between the materials A and B and each exists independently. By forming films by sputtering as described above, it is possible to form low-density thin films in the stage of film forming. Having a low-density thin film, it is possible to increase etching rate difference between light-irradiated region and non-irradiated region and form structures on a substrate of large area uniformly.

With a mixed material of the materials A and B, with the material A being the silicon compound material, a low-density thin film can be formed and light-irradiated region becomes dense due to the generated heat from the light absorption layer by light irradiation. And by being able to increase the density difference between light-irradiated region and non-irradiated region, etching selectivity can be increased in etching. Moreover, constituent element of the material B is dissociated in the light-irradiated region. The sulfur is dissociated in the case of sulfide material. The selenium is dissociated in the case of selenide material. The fluorine is dissociated in the case of fluorine compound material. The composition of the material B changes by the dissociation of elements. The etching selectivity may be increased by the changes in the material composition. As a result, etching selectivity can be increased by both of material densification and material composition change, thereby forming microscopic structures on a medium of large area uniformly. Furthermore, it is possible to form a thick film with low residual stress, because low-density thin film can be formed in the stage of film forming. The structures of high aspect ratio (height of structure/size of structure) can be formed because it is possible to thickly form the thermal reaction material which forms structures.

-Light Absorption Layer-

The material of the light absorption layer 102 is not particularly limited as long as it is a material having a function to generate heat by light absorption, and may be selected accordingly. Examples include semiconductor material such as Si, Ge and GaAs; intermetallic materials containing low-melting-point metals such as Bi, Ga, In and Sn; materials such as Sb, Te, BiTe, BiIn, GaSb, GaP, InP, InSb, InTe and SnSn; carbide material such as C and SiC; oxide material such as $V_2O_5$, $Cr_2O_3$, $Mn_3O_4$, $Fe_2O_3$, $Co_3O_4$ and CuO; nitride material such as AlN and GaN; binary phase-change material such as SbTe; ternary phase-change material such as GeSbTe, InSbTe, BiSbTe and GaSbTe; and quaternary phase-change material such as AgInSbTe.

Of these, a material containing at least one element selected from Sb, Te and In is particularly preferable.

The thickness of the light absorption layer is not particularly limited and may be selected accordingly, and it is preferably in the range of 2 nm to 50 nm. When the thickness is less than 2 nm, it is difficult to form in form of thin film and the light absorption rate may be lowered. When it is more than 50 nm, heat diffusion in the light absorption layer occur and heating microscopic regions may be difficult.

Glass and quartz may be used for a substrate 103. Moreover, substrates used for semiconductor production such as Si and SOI (silicon on insulator); substrates for HDD (hard disc) such as aluminum (Al) and opaque glass substrate; polycarbonate resin, acrylic resin, polyolefin resin, epoxy resin, vinyl ester resin, polyethylene terephthalate (PET) and resin substrates such as ultraviolet curable resin may be used.

The method for manufacturing structure include light irradiation in which a light is irradiated to the medium for forming structure and etching in which the medium is processed with etching. In addition, formed structures may be processed with heat. Moreover, the medium may be further processed with etching by using the formed structures as mask. Further, concavity and convexity may be transferred to other mediums by using the formed structures as mold.

Figure 4:
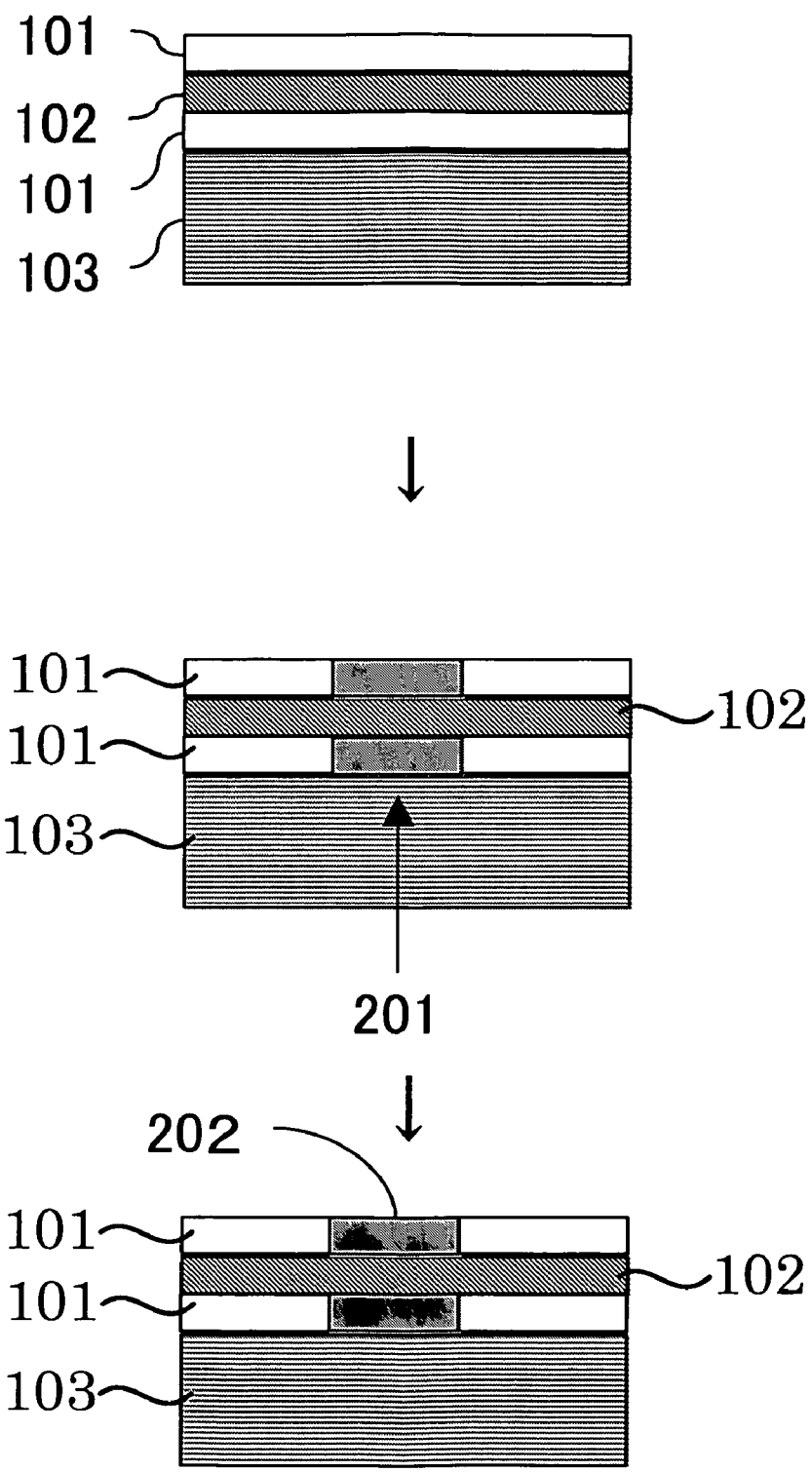
FIG. 4 is a process chart showing light irradiation in the method for manufacturing structure of the present invention and each chart from the top shows (1) medium for forming structure, (2) a condition during light irradiation and (3) a condition after light irradiation.
Figure 5:
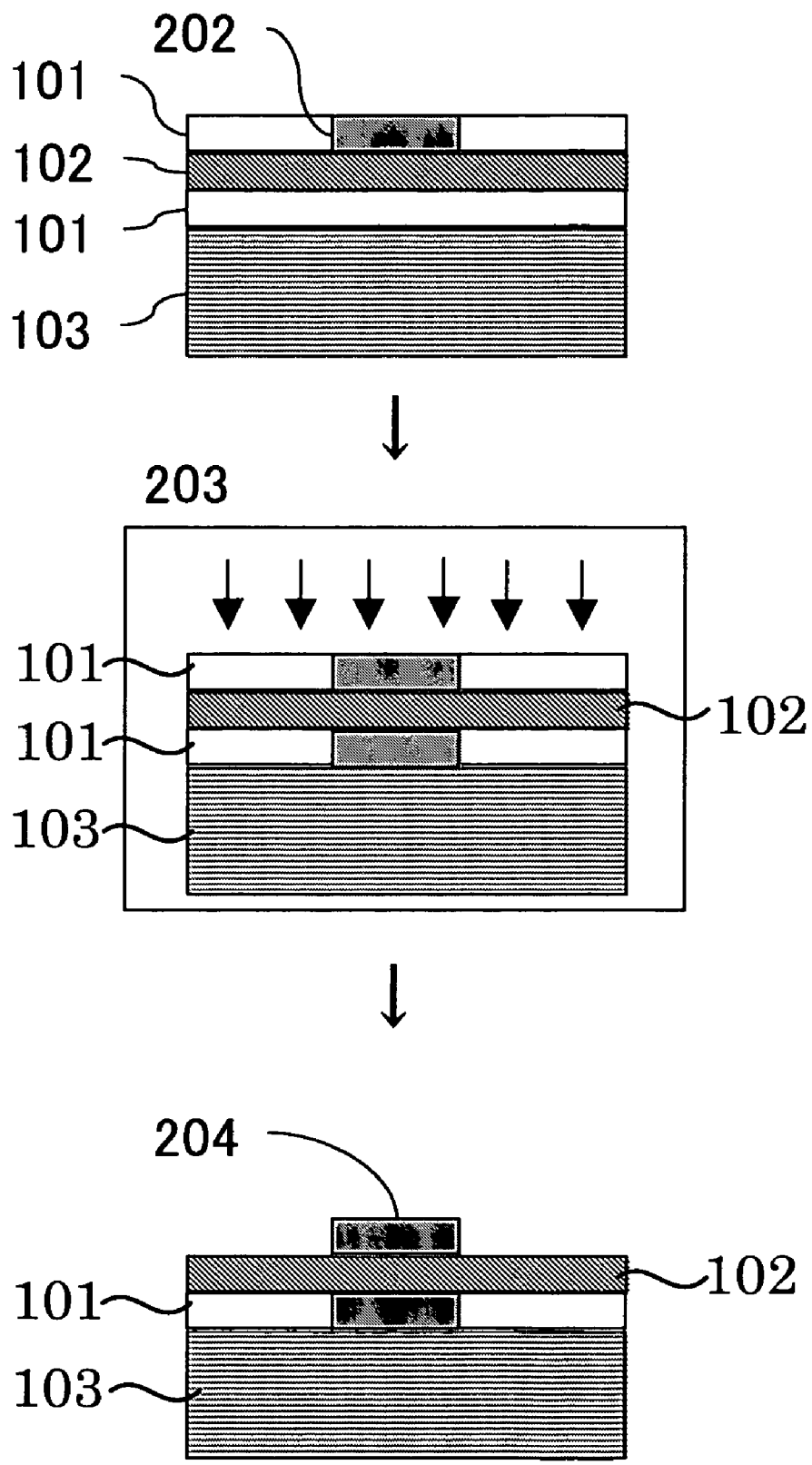
FIG. 5 is a process chart showing etching in the method for manufacturing structure of the present invention and each chart from the top shows (1) a medium condition before etching, (2) a condition during etching and (3) a condition after etching.
Figure 6:
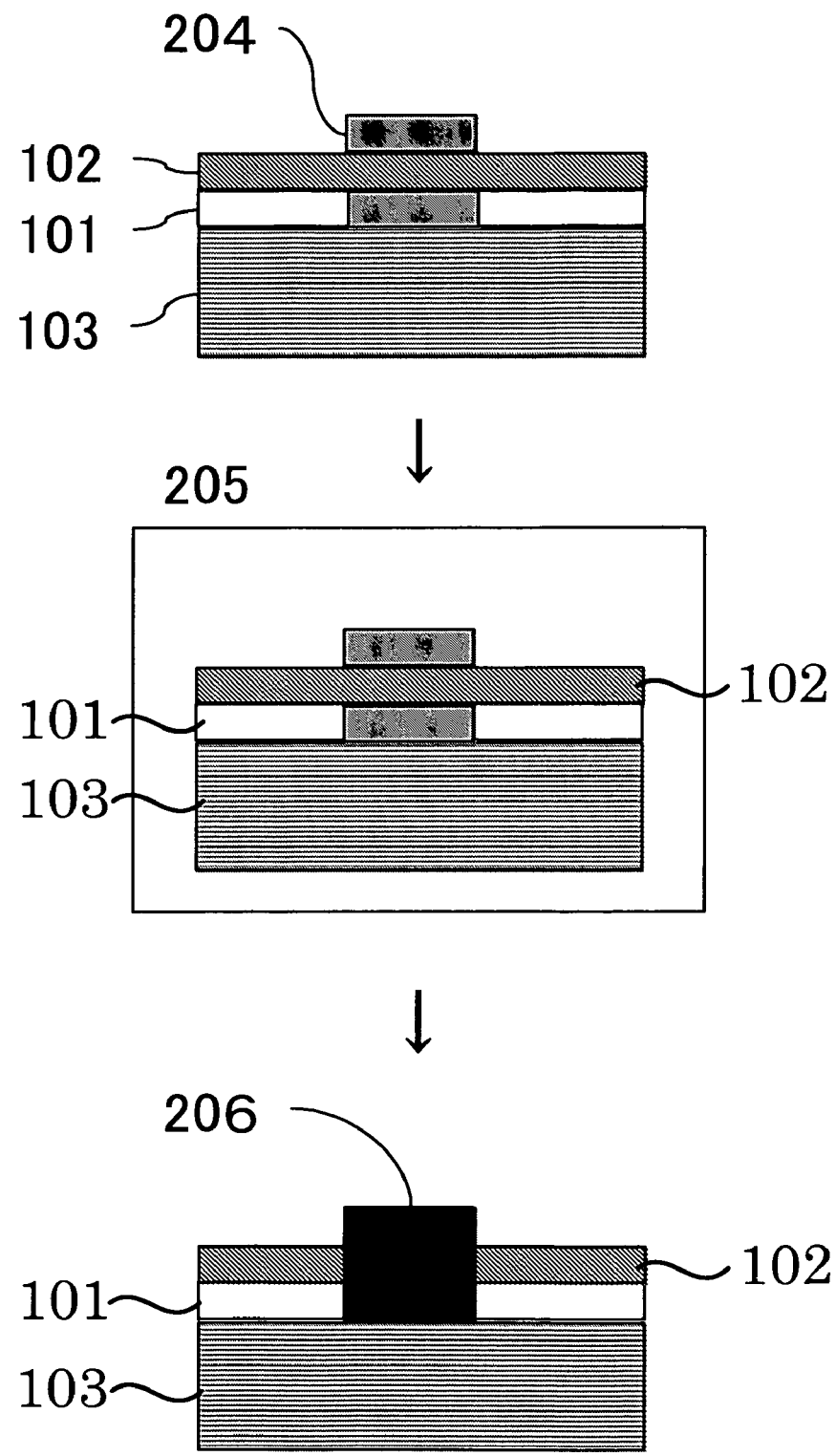
FIG. 6 is a process chart showing heat treatment in the method for manufacturing structure of the present invention and each chart from the top shows (1) a condition before heat treatment, (2) a condition during heat treatment and (3) a condition after heat treatment.
Figure 7:
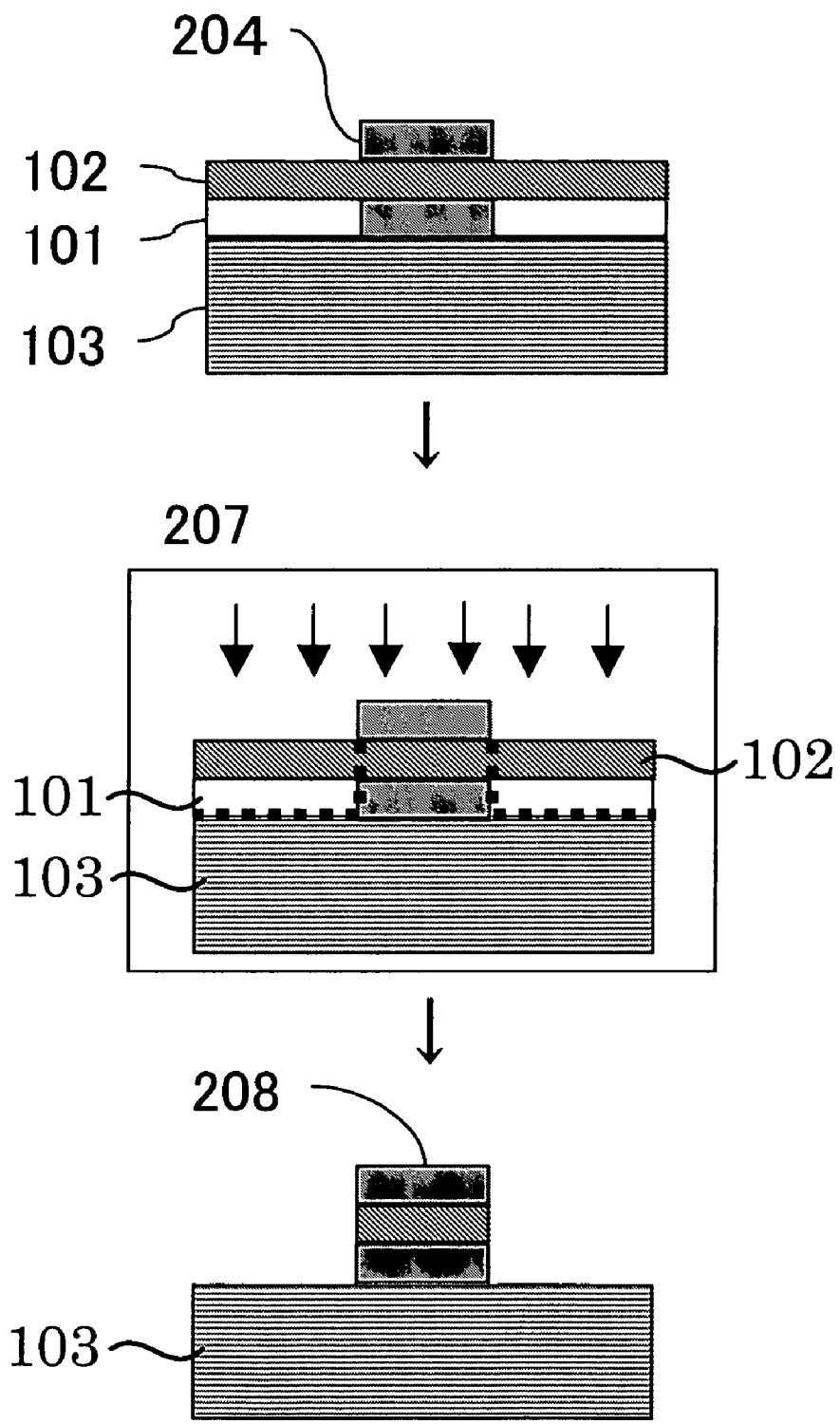
FIG. 7 is a process chart showing second etching in the method for manufacturing structure of the present invention and each chart from the top shows (1) a condition before etching, (2) a condition during etching and (3) a condition after etching.
Figure 8:
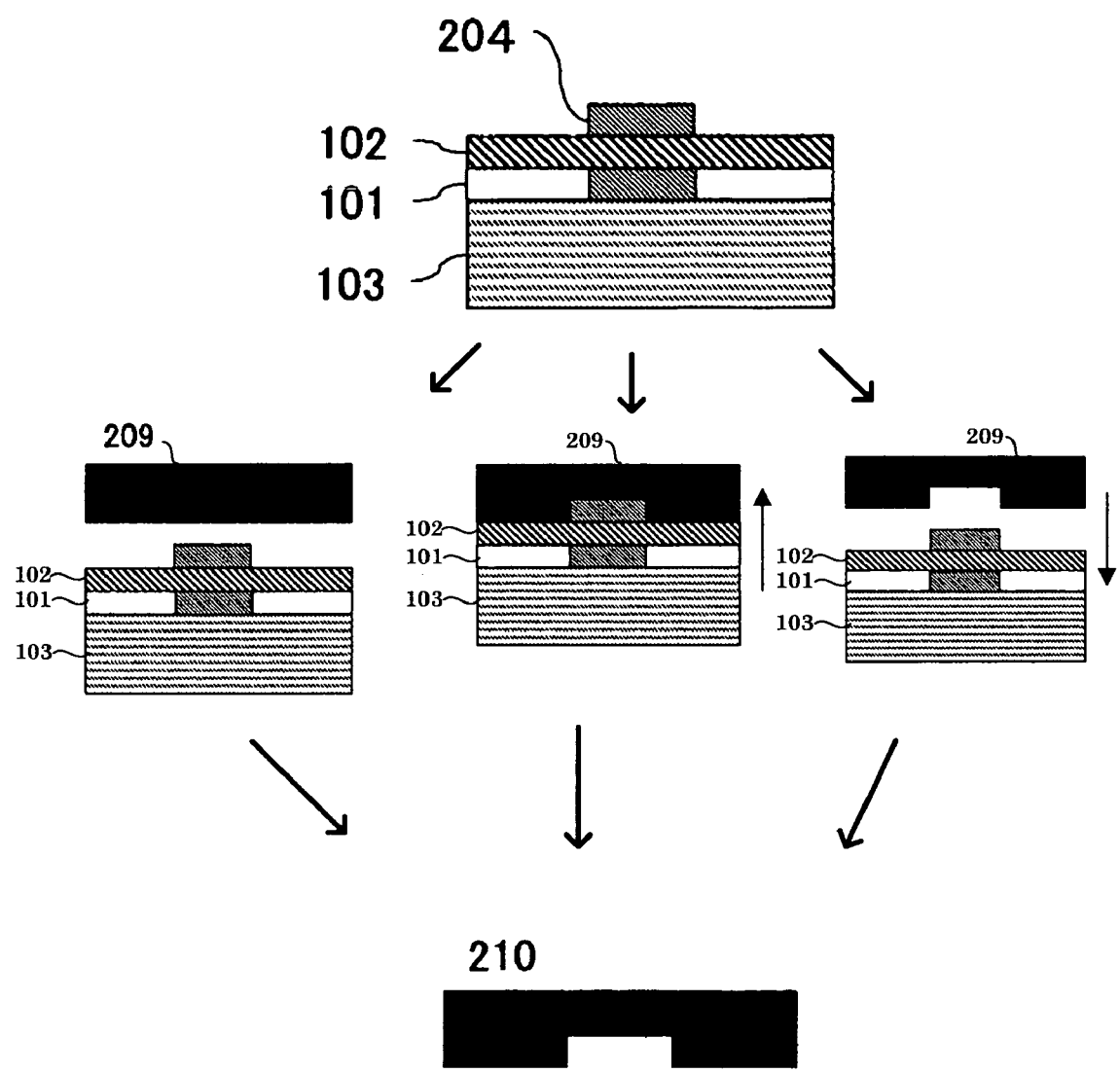
FIG. 8 is a process chart showing transferring in the method for manufacturing structure of the present invention and each chart from the top shows (1) a condition before transferring, (2) a condition during transferring and (3) a medium with concavity and convexity transferred.

FIGS. 4 to 8 show an exemplary method for manufacturing structure using the medium for forming structure as shown in FIG. 2. FIG. 4 shows light irradiation, FIG. 5 shows etching, FIG. 6 shows heat treatment, FIG. 7 shows second etching and FIG. 8 shows transferring, and the detail of each steps are as follow.

In light irradiation of FIG. 4, the top diagram of FIG. 4 shows a medium for forming structure and 101 indicates a thermal reaction layer, 102 indicates a light absorption layer and 103 indicates a substrate. The middle diagram of FIG. 4 shows a condition during light irradiation and 201 indicates the direction of light irradiation. The light is irradiated from the substrate 103 side. The bottom diagram of FIG. 4 shows a condition after irradiation and 202 indicates a region changed with laser irradiation. The changed region is formed in the thermal reaction layers 101 which are arranged above and below the light absorption layer 102.

In the light irradiation, a light is irradiated to a predetermined place in the medium for forming structure in order to form structures. The light source may be moved, the medium may be moved while the light source is fixed or both of the light source and medium may be moved during the step. For the light source, $F_2$ laser of approximately 157 nm wavelength, ArF laser of approximately 193 nm wavelength and KrF laser of approximately 248 nm wavelength may be used. The light irradiation may be performed in the atmosphere. Moreover, a light may be irradiated to the medium in an atmosphere gas, by setting the medium in a hermetically-sealed container and introducing gases such as nitrogen, oxygen, water vapor, argon and hydrogen. Further, a light may be irradiated to the medium in vacuum by setting the medium in a vacuum container.

It is preferable to use semiconductor laser as a laser source in the laser beam irradiation. The wavelength of the semiconductor laser is preferably 370 nm to 780 nm and more preferably 390 nm to 410 nm. In particular, GaN semiconductor layer is used. It is possible to obtain inexpensive laser beam irradiation apparatus by using the semiconductor laser, resulting in lower process cost. Moreover, high-speed modulation of laser beam power level is possible for the semiconductor laser. Therefore, structures can be formed at high speed on a medium of large area. Furthermore, minute laser spots can be formed by using the laser of short wavelength to form microscopic structures.

The laser beam power level is increased at a position where structures are formed during laser beam irradiation to the medium for forming structure. In other words, laser power level is modulated between high level and low level according to the cycle of the structures. A ratio of the time the laser power is maintained at high level (pulse width) to the cycle is a pulse duty (pulse width/cycle), and the pulse duty is preferably set at 10% to 30%. When the pulse duty is less than 10%, the end of the structures goes vapid. It is because the light absorption layer does not generate heat sufficiently. When the pulse duty is more than 30%, contiguous structures may be connected to each other. It is because of the diffusion of heat generated from the light absorption layer.

It is preferable to rotate the medium during laser beam irradiation to the medium for forming structure. A laser beam may be irradiated to the medium while rotating the medium for forming structure and activating focus servo. Also, a laser beam may be irradiated to the medium while rotating the medium for forming structure and activating the focus servo and tracking servo. For the laser source, $F_2$ laser of approximately 157 nm wavelength, ArF laser of approximately 193 nm wavelength and KrF laser of approximately 248 nm wavelength may be used. It is preferable to use semiconductor laser as a laser source. The wavelength of the semiconductor laser is preferably 370 nm to 780 nm and more preferably 390 nm to 410 nm. In particular, GaN semiconductor laser is used. Moreover, it is possible to form structures on a medium of large area at high speed by irradiating a laser beam while rotating the medium at high speed.

Figure 11:
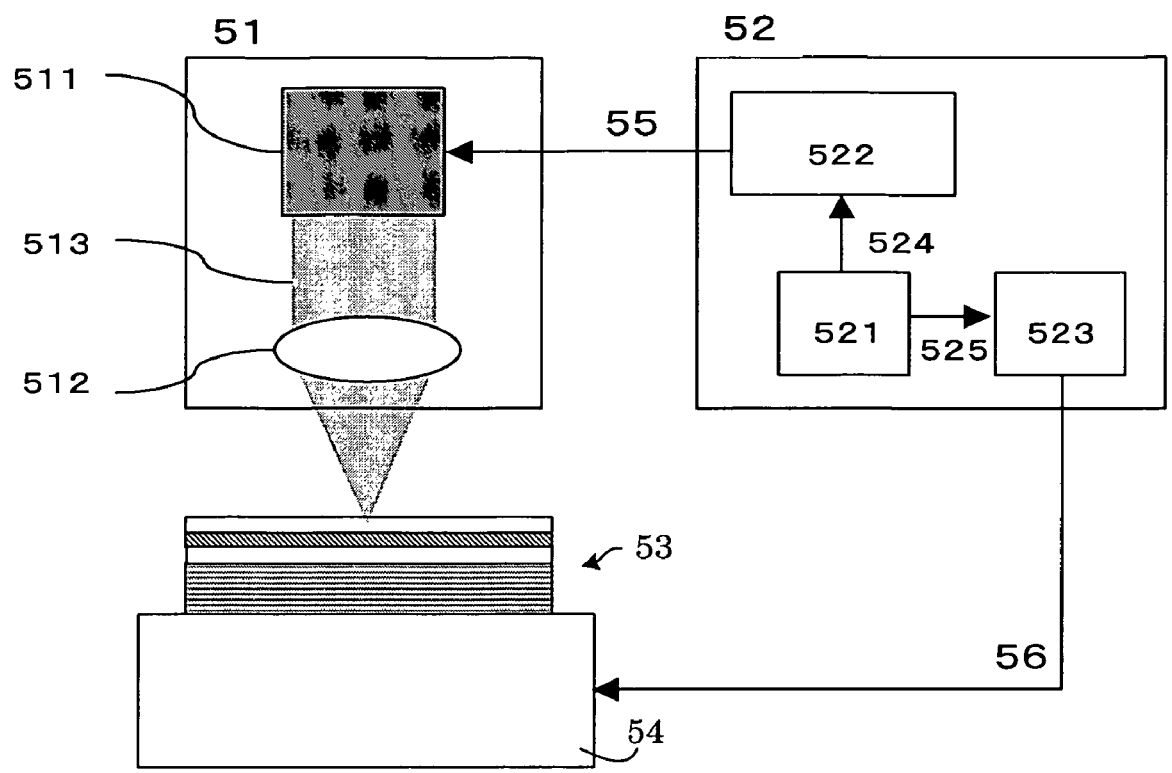
FIG. 11 is an explanatory diagram showing an exemplary laser beam irradiation apparatus used in the method for manufacturing structure of the present invention.

An exemplary composition of the laser beam irradiation apparatus is shown in FIG. 11. A laser beam irradiation unit 51 is equipped with a semiconductor laser 511 and an objective lens 512. The wavelength of the semiconductor laser 511 is 370 nm to 780 nm. The preferable wavelength is 390 nm to 410 nm. For example, GaN semiconductor laser is used. The numerical aperture (NA) of the objective lens 512 is set at 0.5 to 1.0. The preferable numerical aperture is 0.8 to 0.95. A laser beam modulation unit 52 is equipped with a pulse generating circuit 521, a laser driving circuit 522 and standard signal generating circuit 523. The pulse generating circuit 521 generates a laser power level modulation signal 524. Moreover, a modulation timing signal 525 is generated. The laser driving circuit 522 generates a laser driving signal 55 based on the modulation signal 524 from the pulse generating circuit. The standard signal generating circuit 523 generates a standard signal 56 to move a medium driving unit based on the modulation timing signal 525 from the pulse generating circuit. No. 53 indicates a medium for forming structure and 54 indicates the medium driving unit. The medium for forming structure 53 is set at the top of the medium driving unit 54.

By means of the laser beam irradiation apparatus as described above, the medium for forming structure is moved with a timing of laser emission based on the standard signal 56 to form structures at a predetermined spot of the medium.

Figure 12:
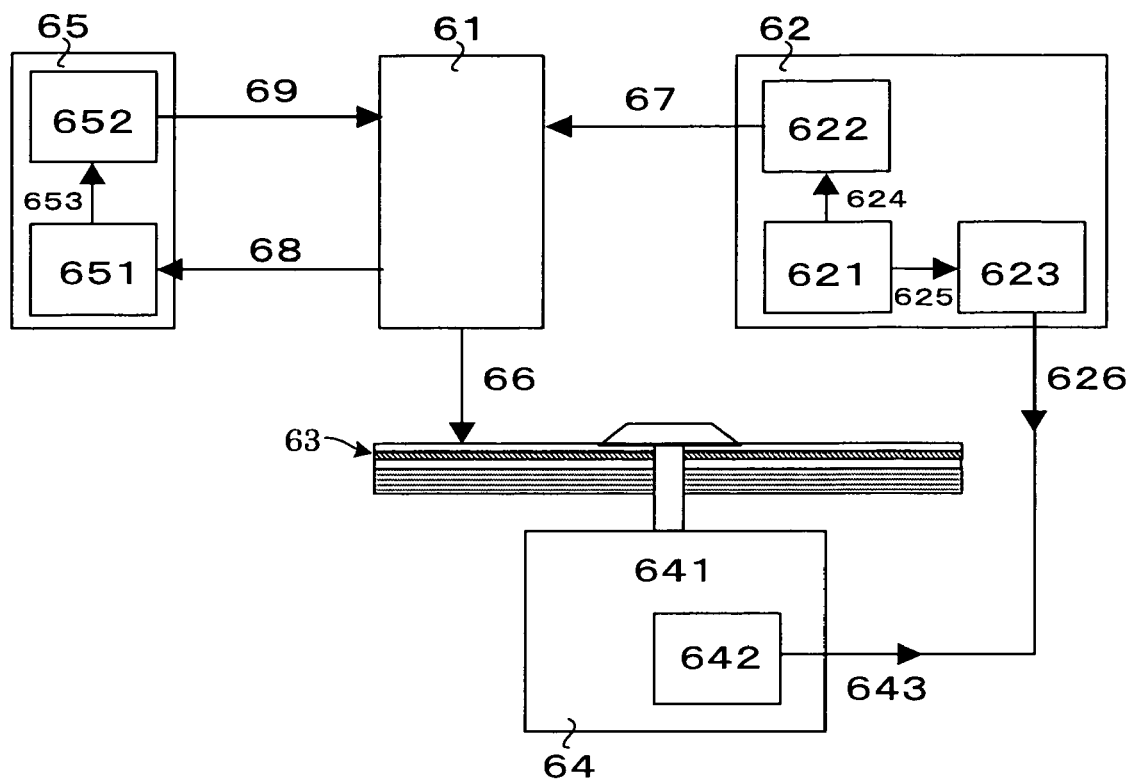
FIG. 12 is an explanatory diagram showing another exemplary laser beam irradiation apparatus used in the method for manufacturing structure of the present invention.

FIG. 12 shows a composition of another laser beam irradiation apparatus. The apparatus consists of a laser beam irradiation unit 61, a laser beam modulation unit 62, a medium rotation unit 64 and a signal detecting unit 65. No. 63 indicates a medium for forming structure and 66 indicates a laser beam.

The laser beam irradiation unit 61 consists of a laser source, an objective lens which focuses the laser beam, an actuator which drives the laser beam irradiation unit. For the laser source, $F_2$ laser of approximately 157 nm wavelength, ArF laser of approximately 193 nm wavelength and KrF laser of approximately 248 nm wavelength may be used. It is also possible to use the semiconductor laser. It is preferable to use the semiconductor laser as a laser source. The wavelength of the semiconductor laser is preferably 370 nm to 780 nm and more preferably 390 nm to 410 nm. In particular, GaN semiconductor laser is used. The numerical aperture of objective lens is set at 0.5 to 1.0. The preferable numerical aperture is 0.8 to 0.95.

The laser beam modulation unit 62 is equipped with a pulse generating circuit 621, a laser driving circuit 622 and a standard signal generating circuit 623. The pulse generating circuit 621 generates a laser power level modulation signal 624 and a modulation timing signal 625.

The laser driving circuit 622 generates a laser driving signal 67 based on the modulation signal 624 from the pulse generating circuit. The standard signal generating circuit 623 generates a pulse standard signal 626 based on the modulation timing signal 625 from the pulse generating circuit.

The medium rotation unit 64 is equipped with a spin stand 641 for rotating the medium, and a standard signal generating circuit 642. The standard signal generating circuit 642 generates a rotation standard signal 643 based on the signal from the spin stand. A pulse standard signal 626 and a rotation standard signal 643 are frequency locked to rotate the spin stand.

The laser beam detecting unit 65 consists of a light detecting device 651 and a servo circuit 652. The light detecting device 651 receives a signal 68 from the medium and generates a focus and track error signal 653. The servo circuit 652 generates a driving signal for the laser beam irradiation unit 69 based on the error signal.

By means of the laser beam irradiation apparatus as described above, structures are formed at predetermined spots of the medium while rotating the medium and controlling the focus and track errors.

In etching step as shown in FIG. 5, the top diagram of FIG. 5 shows a medium shape before etching and 202 indicates a changed region with laser irradiation. The middle diagram of FIG. 5 shows a condition during etching and 203 indicates an etching apparatus. The bottom diagram of FIG. 5 shows a condition after etching and 204 indicates a structure.

In etching, a part of the medium is removed to form a structure. As described above, the changed region 202 is formed by thermal reaction due to light irradiation. The difference in etching rate occurs between changed region and unchanged region because the etching rate in the changed region decreases, and the changed region remains as a structure after etching. At least the thermal reaction layer 101 is processed with etching in etching step, however, both of the thermal reaction layer 101 and the light absorption layer 102 may be processed with etching. Moreover, other stacked layers may be processed with etching.

A dry etching may be employed as an etching method. Examples of dry etching include RIE (Reactive Ion Etching), ICP (Inductively Coupled Plasma) or sputter etching. The medium is set in a vacuum apparatus and left unattended for a given period of time in an etching gas atmosphere to form structures.

A wet etching may be employed for etching.

Figure 10:
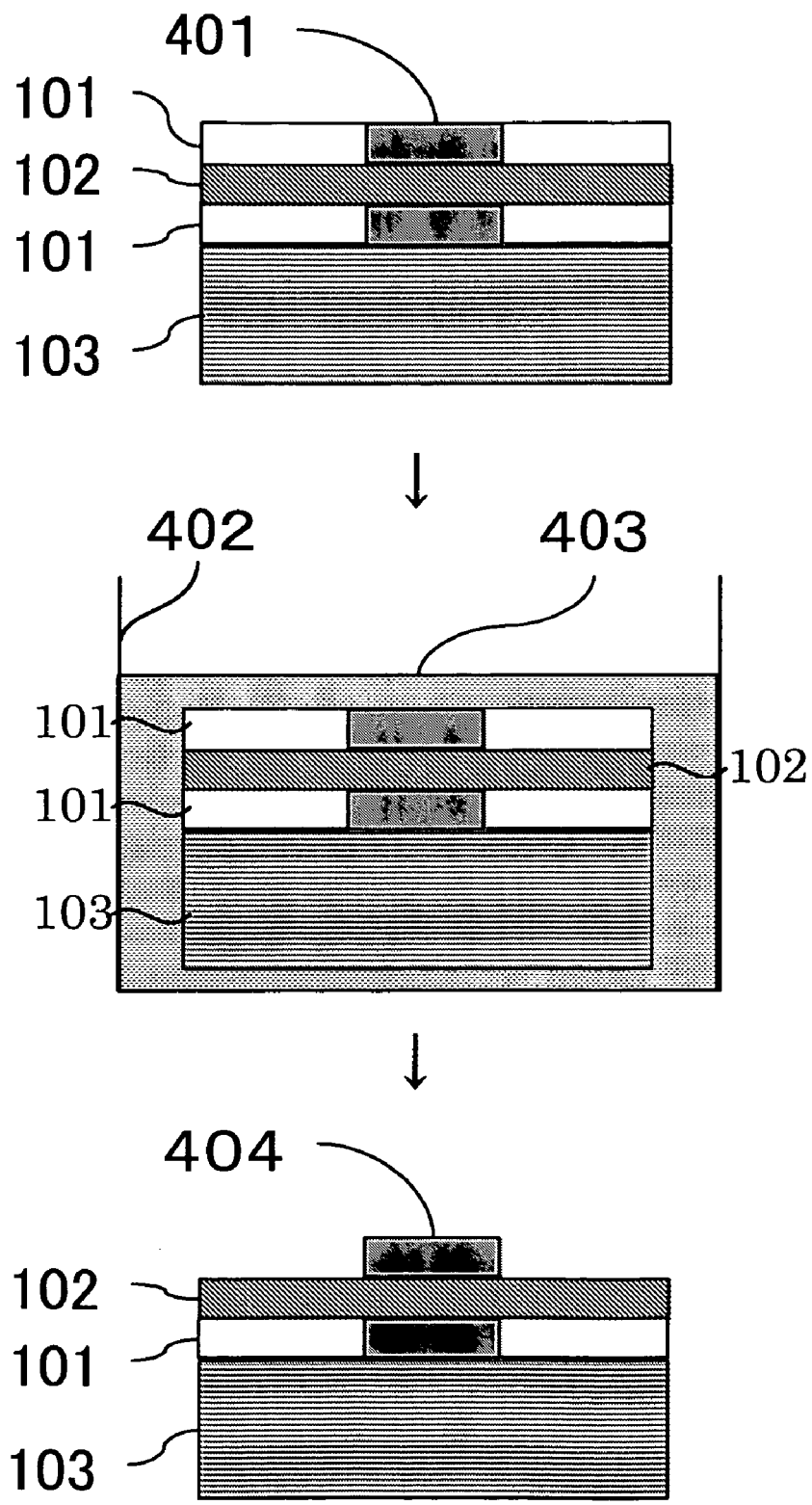
FIG. 10 is an explanatory diagram showing an exemplary etching in the method for manufacturing structure of the present invention and each shows (1) a medium condition before etching, (2) a condition during etching and (3) a condition after etching.

FIG. 10 is an explanatory diagram showing an exemplary etching. The top diagram of FIG. 10 shows a medium shape before etching and 101 indicates a thermal reaction layer, 102 indicates a light absorption layer and 103 indicates a substrate. No. 401 indicates a changed region with light irradiation. The middle diagram of FIG. 10 shows a condition during etching and 402 indicates an etching apparatus (etching vessel) and 403 indicates an etching solution. The bottom diagram of FIG. 10 shows a condition after etching and 404 indicates a structure.

A method in which the medium is dipped in acid solution, alkaline solution and organic solvent may be used as a wet etching method. By dipping the medium in the etching solution 403 in a given period of time, the region other than the changed region with laser beam irradiation is dissolved to form structures. By this method, structures can be formed by an inexpensive method without using vacuum apparatus.

In the method for manufacturing structures, a mixture of material A and material B, with the material A being a silicon compound material, is used for the thermal reaction layer. The wet etching using a water solution containing hydrofluoric acid is used in etching. The etching solution as indicated by 403 of FIG. 10 is a water solution containing hydrofluoric acid. The water solution containing hydrofluoric acid selectively dissolves silicon compound material. In the non-irradiated region, the silicon compound material as the material A is dissolved. In the mixture of the material A and the material B, the material B is lifted off as the material A is dissolved. Because the densification of the materials A and B, and the change in the material B composition are taking place in the changed region 401 by light irradiation, etching resistance relative to the water solution containing hydrofluoric acid is increased. Therefore, the changed region by light irradiation remains to form structures. Moreover, the light absorption layer 102 has a very high etching resistance relative to the water solution containing hydrofluoric acid, thereby functioning as an etching stopping layer in etching. By having the etching stopping layer, structures can be formed uniformly even on a medium of large area.

A mixed liquid of commercially available 50% by mass dilute solution and water is preferably used as the hydrofluoric acid solution. A mixing ratio, hydrofluoric acid (50% dilution):water, is preferably in the range of 1:4 to 1:50. If the density of the hydrofluoric acid is denser than 1:4, the surface roughness of the light absorption layer or the thermal reaction layer increases. If the density of the hydrofluoric acid is less dense than 1:50, the etching time is lengthened and the process cost is increased.

In the heat treatment step as shown in FIG. 6, formed structures are heated in a gas atmosphere to remove the defects of the structures and the medium. Further, an interdiffusion of constituent elements takes place between each stacked layer and structures. By having the interdiffusion, adhesion between structures and other layers is increased. The top diagram of FIG. 6 shows a medium condition before heat treatment and 204 indicates a structure. The middle diagram of FIG. 6 shows a condition during heat treatment and 205 indicates a heat treatment device. The bottom diagram of FIG. 6 shows a condition after heat treatment and 206 indicates a condition in which the structure is changed by heating. The heat treatment may be performed in the atmosphere. Moreover, the heat treatment may be performed in an atmosphere gas, by setting the medium in a hermetically-sealed container and introducing gases such as nitrogen, oxygen, water vapor, argon and hydrogen. Further, the heat treatment may be performed in vacuum by setting the medium in a vacuum container. The heat treatment may be performed by high frequency induction heating and may also be performed by a lamp heating using halogen lamp or xenon lamp as a light source.

In second etching as shown in FIG. 7, the medium is further processed with etching using formed structures as a mask. The top diagram of FIG. 7 shows a medium condition before etching and 204 indicates a structure. The middle diagram of FIG. 7 shows a condition during etching and 207 indicates an etching apparatus. The bottom diagram of FIG. 7 shows a condition after etching and 208 indicates a structure.

A dry etching may be employed as an etching method. Examples of dry etching include RIE (Reactive Ion Etching), ICP (Inductively Coupled Plasma) or sputter etching. The medium is set in a vacuum apparatus and left unattended for a given period of time in an etching gas atmosphere to form structures. Only a layer 102 directly below the structure 204 may be etched, or a substrate 103 may also be etched.

A wet etching as described above may also be used as an etching method.

In transferring as shown in FIG. 8, concavity and convexity are transferred to other mediums using formed structures as mold. The top diagram of FIG. 8 shows a medium with formed structures used as mold. The middle diagram of FIG. 8 shows a condition during transferring and 209 indicates a medium to which concavity and convexity of the structures are transferred. The bottom diagram of FIG. 8 shows a condition after transferring. The compression molding, injection molding and 2P transferring (optical curing and heat curing) may be used as a transferring method. Examples of the medium material, to which concavity and convexity of structures are transferred, include resin materials such as polycarbonate resin, acrylic resin, polyolefin resin, epoxy resin, vinyl ester resin and ultraviolet curable resin.

The process combinations as shown in FIGS. 4 to 8 are changed according to the compositions and materials of the medium for forming structure as shown in FIGS. 1 to 3. For example, structures can be formed by the following process combinations.

Forming Method 1: light irradiation→etching

Forming Method 2: light irradiation→etching→heat treatment

Forming Method 3: light irradiation→etching→heat treatment→second etching

Forming Method 4: light irradiation→etching→heat treatment→second etching→transferring Forming Method 5: light irradiation→etching→transferring Forming Method 6: light irradiation→etching→heat treatment→transferring Forming Method 7: light irradiation→etching→second etching→transferring The method for forming structures of the present invention preferably uses a medium for forming structure in which a thermal reaction layer is positioned as an uppermost layer of the stacked composition, and contains a material having an optical transparency in wavelength of irradiated light. Moreover, a laser beam is irradiated from the uppermost layer, the thermal reaction layer side in light irradiation.

Figure 9:
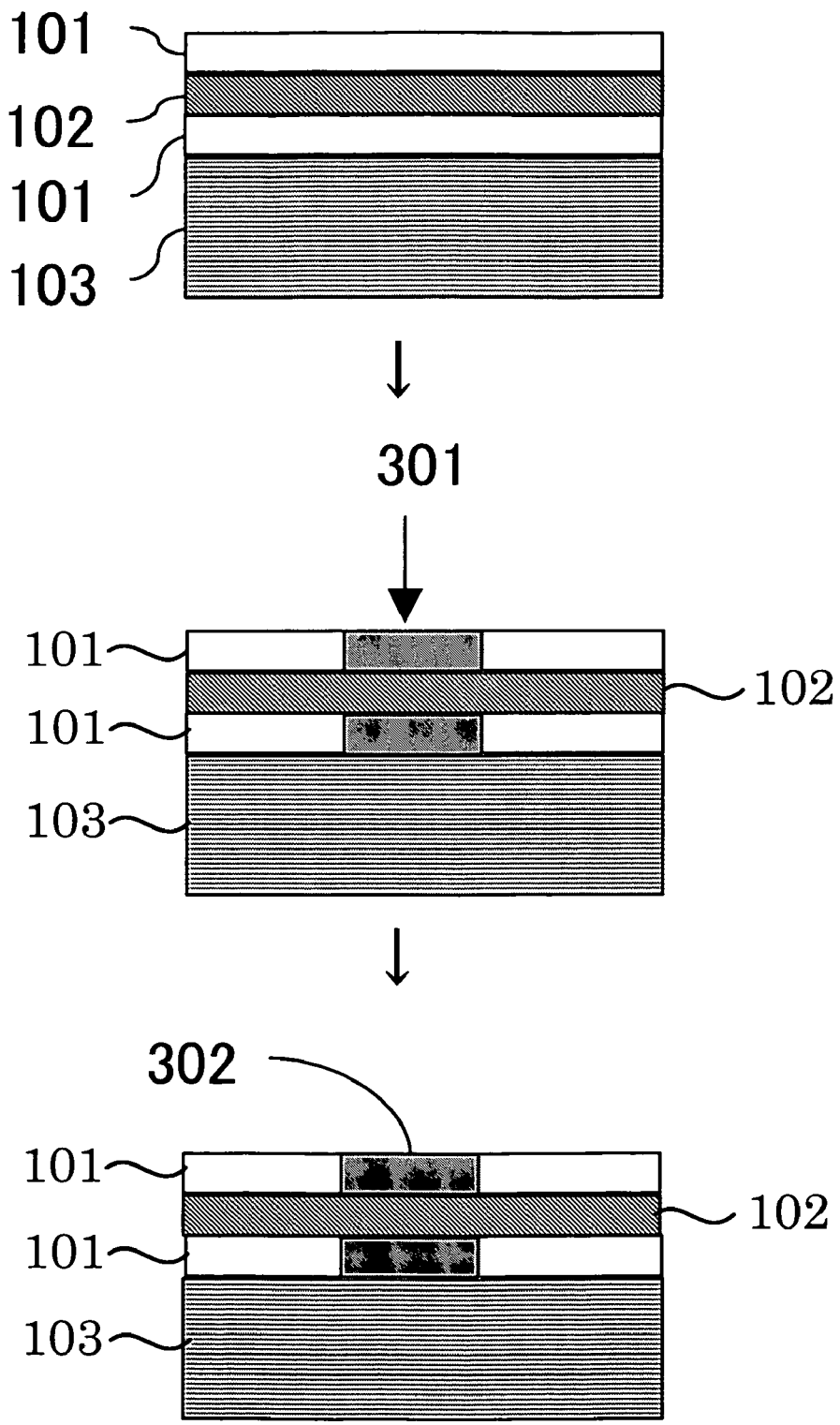
FIG. 9 is an explanatory diagram showing an exemplary light irradiation in the method for manufacturing structure of the present invention and each shows (1) a medium for forming structure, (2) a condition during light irradiation and (3) a condition after light irradiation.

FIG. 9 shows an example of the method for manufacturing structure. The top diagram of FIG. 9 shows a medium for forming structure and 101 indicates a thermal reaction layer, 102 indicates a light absorption layer and 103 indicates a substrate. The thermal reaction layer is positioned as an uppermost layer of the stacked composition. The thermal reaction layer may also be disposed as other layers. The middle diagram of FIG. 9 shows a condition during light irradiation and 301 indicates a direction of light irradiation. The light is irradiated from the uppermost layer, the thermal reaction layer side. In other words, it is irradiated without the substrate. It is stated as "surface injection" in the following description. By employing surface injection, production of aberration by the substrate can be prevented. Furthermore, NA of objective lens can be increased to focus the light beam. By focusing, a changed region 302 can be formed in more microscopic region of the thermal reaction layer. The bottom diagram of FIG. 9 shows a condition after irradiation and 302 indicates the changed region with laser beam irradiation. The changed region 302 is formed in the thermal reaction layer 101 disposed above and below the light absorption layer 102.

A material having a high transparency in the wavelength of irradiated light is used for the thermal reaction layer 101. In particular, a material having a light absorptivity in the range of $1 \times 10^{-3}$ to $1 \times 10^{-5}$ in the wavelength of irradiated light is used. By using the material having a high light transparency, light absorption in the thermal reaction layer can be prevented. Because the changed region 302 can be formed by the heat generated from the light absorption layer alone, the changed region forming structures can be micronized.

For the thermal reaction layer, silicon compound materials such as $SiO_2$, SiON and $Si_3N_4$, sulfide materials such as ZnS, CaS and BaS, selenide materials such as ZnSe and BaSe and fluorine compound materials such as $CaF_2$ and $BaF_2$ having a light absorption rate in the range of $1 \times 10^{-3}$ to $1 \times 10^{-5}$ may be used. In the method for manufacturing, the thickness of the thermal reaction layer corresponds to the height of the structures. Therefore, the thickness of the thermal reaction layer is set at the height of the forming structures.

The above material and steps may be used for the material of other layers and the steps for forming structures.

(Structure)

The structures of the present invention are manufactured by the method for manufacturing structure of the present invention.

Figure 29:
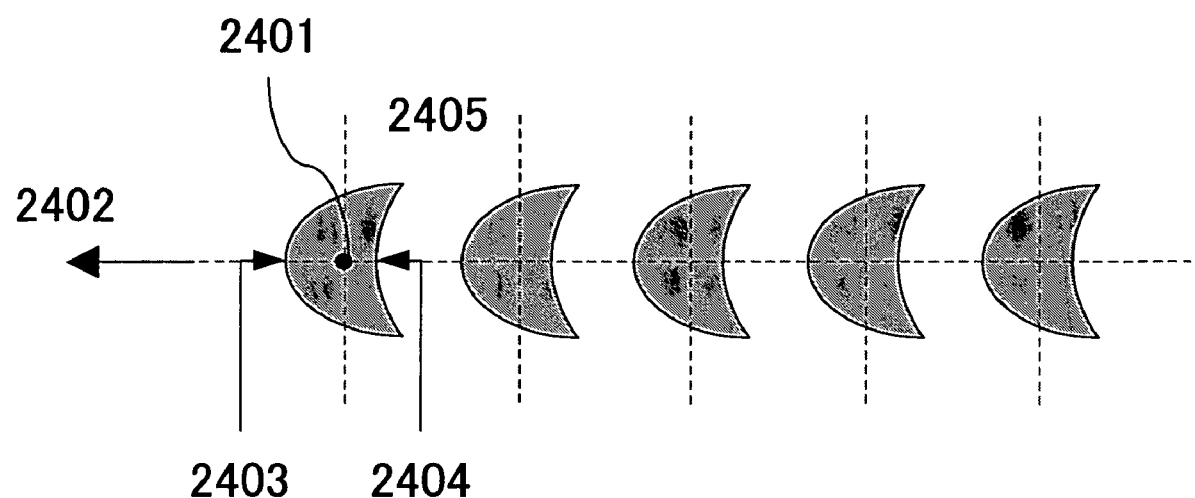
FIG. 29 is a top view showing an example of existing structures.
Figure 30:
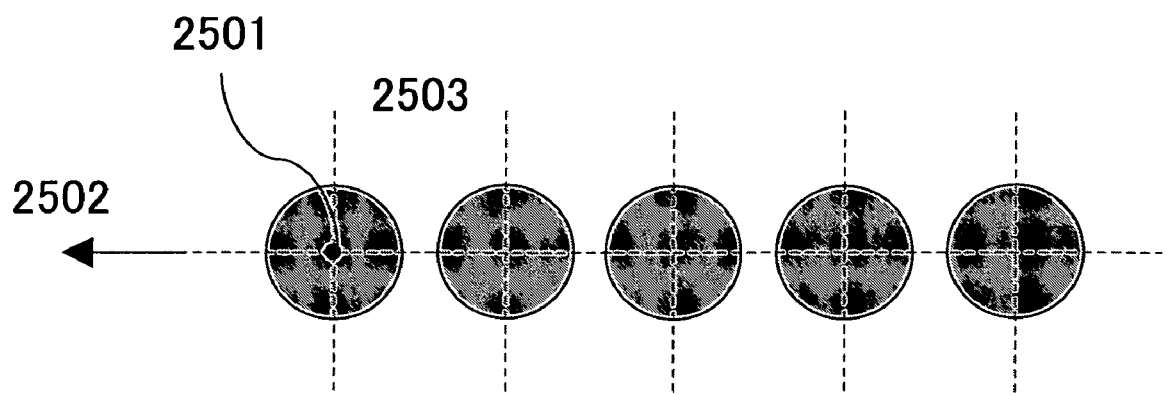
FIG. 30 is a top view showing exemplary structures of the present invention.

FIGS. 29 and 30 shows top views of the structure shapes.

FIG. 29 is an example of forming structures by using phase-change material by a method disclosed in JP-A No. 9-115190 and No. 10-97738.

The composition of the medium for forming structure is a stacked composition of GeSbTe, which is a phase-change material, on a polycarbonate resin substrate. The structures were formed by irradiating a laser beam followed by etching to form phase-change material in convex form. Etching was performed by using KOH, an alkaline solution. The etching time was for 30 minutes.

No. 2401 in FIG. 29 indicates GeSbTe, the phase-change material in convex form which forms a structure. No. 2402 indicates a traveling direction of the laser beam, 2403 indicates a front end of the structure and 2404 indicates a back end of the structure. In the case of the phase-change material, etching rate difference occurs because of the difference in between crystalline phase state and amorphous state and the structures can be formed by etching. Generally, a region remaining as the structure 2401 is in amorphous state. The other region 2405 (the region other than 2401 with hatching in FIG. 29) is in crystalline state. The back end region 2404 is crystallized in the process where the phase-change material becomes amorphous by laser beam irradiation. Therefore, the shape of the structure becomes a falcate form where the back end 2404 looks like being squeezed as shown by 2401 in FIG. 29. In the method for manufacturing structures using the phase-change material, the shape takes the same form even if the material composition is changed. Because of its complicated form, an applicable range is limited. Further, when it is applied for the optical recording medium which will be described later, interference between codes (mutual interference with signals from adjacent marks) becomes complicated, requiring a complicated and expensive signal processing technique.

FIG. 30 shows a shape of structures manufactured by the method for manufacturing structure of the present invention. The composition of the medium for forming structure is a stacked composition of AgInSbTe as a light absorption layer and $ZnS—SiO_2$ as a thermal reaction layer on a polycarbonate resin substrate. The structures were formed by irradiating a laser beam followed by etching to form $ZnS—SiO_2$ in convex form. The etching was performed by using a mixed solution of hydrofluoric acid and water, which is an acid solution. The etching time was for 20 seconds.

No. 2501 in FIG. 30 indicates $ZnS—SiO_2$ in convex form, which forms a structure. No. 2502 indicates a traveling direction of the laser beam and 2503 indicates the region other than structures and it is a AgInSbTe surface, which is the light absorption layer. The structures in approximate circular form are formed by the method of the present invention. Since they are in simple circular form, the structures have a wide applicable range.

Furthermore, when they are applied for the optical recording medium which will be described later, interference between codes (mutual interference with signals from adjacent marks) is simplified and complicated signal processing techniques are not needed. Moreover, they are also applicable for multiple-value recording by changing the diameter of the structures according to recorded information.

Figure 13:
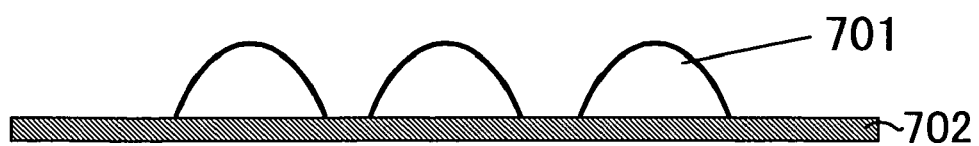
FIG. 13 is a diagram showing an exemplary cross-sectional shape of the structures.
Figure 14:
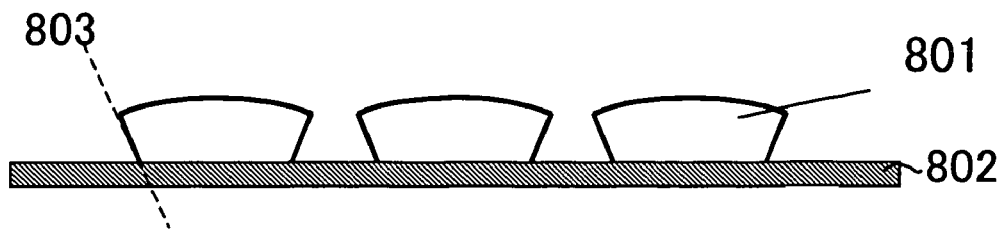
FIG. 14 is a diagram showing an exemplary cross-sectional shape of the structures of the present invention.
Figure 15:
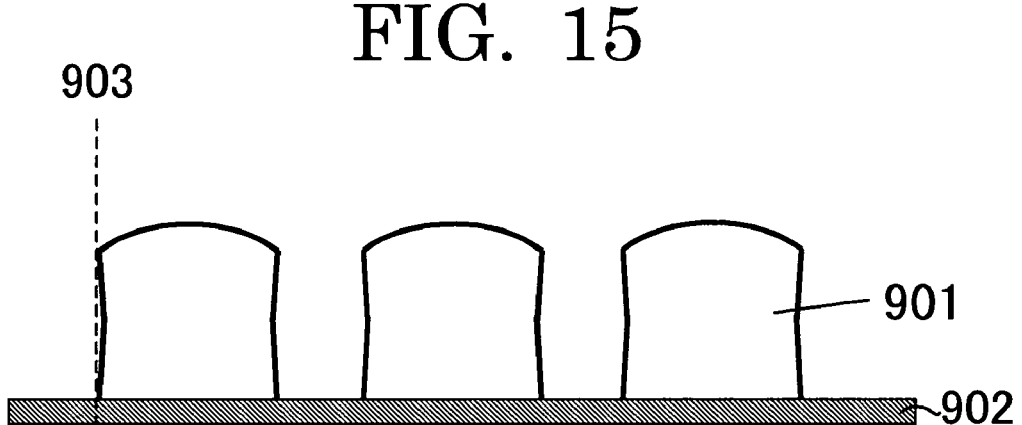
FIG. 15 is a diagram showing an exemplary cross-sectional shape of the structures of the present invention.

FIGS. 13 to 15 show schematic cross-sectional diagrams of the structures. FIG. 13 shows a general cross-sectional shape of the structures and FIGS. 14 and 15 show structure shapes of the present invention.

The cross-sectional shape of the structures as shown in FIG. 13 is a cross-sectional shape when the structures are manufactured by a method in which a light absorption material is changed by heat such as the ones disclosed in JP-A Nos. 2001-250279, 2001-250280, 2003-145941 and 2002-365806.

No. 701 in FIG. 13 indicates a structure. The material is a cyanine dye, which is a recording material of rewritable optical disc. No. 702 indicates a light absorption layer and the material is GeSbTe, a phase-change material. Meanwhile, only structures and light absorption layer are shown in FIG. 13, however, thermal reaction layers or substrates that are not forming structures may also be disposed. The wavelength of the laser beam used for forming structures is 405 nm and the cyanine dye absorbs light in this wavelength. When the thermal reaction material which forms structures absorbs light, the cross-sectional shape tends to go vapid as shown in FIG. 13.

FIGS. 14 and 15 are the shapes of the structures of the present invention when the edges of cross-section of the structures are approximate vertical shape or approximate inverse tapered shape. FIG. 14 shows an edge of approximate inverse tapered shape. No. 801 indicates a structure made of $ZnS—SiO_2$. No. 802 indicates a light absorption layer made of GeSbTe, a phase-change material.

No. 803 in FIG. 14 indicates a tilt angle of the cross-section of the structure. The wavelength of the laser beam used for forming structures was 405 nm and $ZnS—SiO_2$ does not absorb light in this wavelength. A cross-sectional shape can become approximate inverse tapered shape as shown in FIG. 15 by using a material which does not absorb light for the thermal reaction layer which forms structures, and by thermally changing the thermal reaction layer by heat generated from the light absorption layer and irradiating a light from the thermal reaction layer side.

FIG. 15 shows an edge of approximate vertical shape. No. 901 indicates a structure and 902 indicates a light absorption layer. The materials of structures and light absorption layer are the same as in FIG. 14.

No. 903 in FIG. 15 indicates a tilt angle of the cross-section. The structures having edges of approximate vertical shape can be formed by adjusting etching condition.

Meanwhile, only structures and light absorption layer are shown in FIGS. 14 and 15, however, thermal reaction layers or substrates that are not forming structures may also be disposed. With the end shape of the structures being approximate vertical or approximate inverse tapered shape, it is possible to avoid problems of connection between adjacent structures when the structures are more closely arranged.

The structures manufactured by the method for manufacturing structure of the present invention can be applied for various fields such as the optical recording medium which will be explained later, and biochips, photonic crystals and element separation material of various electric devices.

(Optical Recording Medium and Method for Reproducing Optical Recording Medium)

In the first embodiment, the optical recording medium of the present invention contains a substrate, and a light absorption layer which absorbs reproducing light to generate heat and convex structures, which are in contact with the light absorption layer and contain a different material than that of the light absorption layer, on the substrate.

In the first embodiment of the method for reproducing of the present invention, an optical recording medium which contains a substrate, and a light absorption layer which absorbs reproducing light to generate heat and convex structures, which are in contact with the light absorption layer and contain a different material than that of the light absorption layer, on the substrate are used, and a light is irradiated to the light absorption layer and convex structures from the convex structure side and the changes in reflected light amount is detected.

In the second embodiment, the optical recording medium of the present invention contains a substrate, and a light absorption layer which absorbs reproducing light to generate heat and convex structures, which are in contact with the light absorption layer and contain a different material than that of the light absorption layer, on the substrate and an optical transmission layer having an optical transparency relative to the reproducing light on the convex structures, wherein the optical transmission layer is applied on the surface of convex structures and is formed in approximate hemispheric form.

In the second embodiment of the method for reproducing of the present invention, an optical recording medium containing a substrate, and a light absorption layer which absorbs reproducing light to generate heat and convex structures, which are in contact with the light absorption layer and contain a different material than that of the light absorption layer, on the substrate and an optical transmission layer having an optical transparency relative to the reproducing light on the convex structures, wherein the optical transmission layer is applied on the surface of convex structures and is formed in approximate hemispheric form is used. A light is irradiated to a stacked body having the light absorption layer, convex structures and the optical transmission layer from the optical transmission layer side and the changes in reflected light amount is detected.

The optical recording medium of the present invention is a recording medium which performs recording and reproducing of information by light, and there are 5 embodiments in the optical recording medium of the present invention which will be described below, and 5 methods for reproducing according to each embodiment. The optical recording medium of the first embodiment to the 5th embodiment and the method for reproducing of the first embodiment to the 5th embodiment will be explained sequentially below.

<The Optical Recording Medium and Method for Reproducing thereof of the First Embodiment>

The optical recording medium of the present invention of the first embodiment is for the purpose of achieving higher recording density with a super-resolution reproduction.

The optical recording medium contains a substrate, and a light absorption layer in form of thin film, which absorbs reproducing light and generates heat, and convex structures, which are in contact with the light absorption layer, on the substrate and further contains other layers as necessary.

Figure 19:
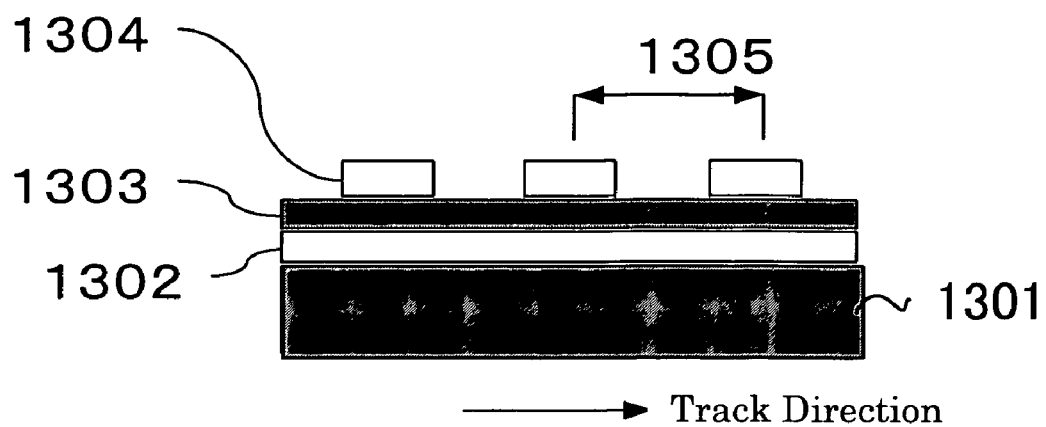
FIG. 19 is an explanatory diagram showing an exemplary optical recording medium of the present invention.

FIG. 19 shows an exemplary composition of the optical recording medium of the first embodiment. In the optical recording medium, a buffer layer 1302 in form of thin film which protects the substrate is formed on the substrate 1301, and a light absorption layer 1303 in form of thin film and convex structures 1304, which are in contact with the light absorption layer, are formed on the buffer layer 1302. Each convex structure 1304 is separated on the surface of the medium as shown in FIG. 19.

The material of the substrate 1301 is not particularly limited and may be selected accordingly. For example, glass, ceramics and resins are used and a resin-made substrate is preferable in terms of formability and cost. Examples of resins include polycarbonate resin, acrylic resin, epoxy resin, polystyrene resin, acrylonitrile-styrene copolymer, polyethylene resin, polypropylene resin, silicon resin, fluorine resin, ABS resin and urethane resin. Of these, polycarbonate resin is particularly preferable in terms of formability, optical properties and cost.

It is also possible to dispose pregrooves and prepits for tracking laser beams on the surface of the substrate 1301.

It is preferable to use a mixture of compounds such as $SiO_2$, or $SiO_2$ and ZnS, ZnO, $Si_3N_4$, $Al_2O_2$ and AlN.

The thickness of the buffer layer is not particularly limited and may be selected accordingly. It is preferably 20 nm to 100 nm. The buffer layer is formed for preventing heat diffusion from the light absorption layer to the substrate. If the thickness is less than 20 nm, a thermal diffusion depression effect may be degraded. If it is more than 100 nm, residual stress in the film is increased and may cause problems such as warped medium.

The light absorption layer 1303 is preferably containing at least one type of element selected from Sb, Te and In. In particular, binary material such as SbTe and InTe, ternary material such as GeSbTe and InSbTe and quaternary material such as AgInSbTe are used. Further, semiconductor materials such as Si and Ge may be used.

These materials that are making up the light absorption layer 1303 generate heat by laser beam irradiation, and optical properties such as refractive index and absorption coefficient are changed. By laminating these materials with convex structures, the optical properties in regions corresponding to the convex structures can be changed by laser beam irradiation.

Moreover, since the materials are in amorphous or in multicrystalline state, and the residual stress in the thin film is low, production of defects such as cracks can be inhibited even though precipitous temperature change takes place in the method for manufacturing the optical recording medium of the present invention, which will be described later. Because of this effect, microscopic convex structures can be formed in the large area.

The thickness of the light absorption layer is not particularly limited and may be selected accordingly. It is preferably 2 nm to 50 nm, for example. When the thickness is less than 2 nm, it is difficult to form in form of thin film and light absorption rate may be lowered. When it is more than 50 nm, heat diffusion in the light absorption layer occurs, and changing the optical properties in minute regions of the light absorption layer may be difficult.

The convex structure 1304 contains a mixture of material A and material B, and the material A is a silicon compound material, and the material B is preferably at least one selected from sulfide material, selenide material and fluorine compound material.

Examples of the silicon compound material of the material A include $SiO_2$, $SiON$ and $Si_3N_4$.

Examples of the sulfide material of the material B include ZnS, CaS and BaS.

Examples of the selenide material include ZnSe and BaSe.

Examples of the fluorine compound material include $CaF_2$ and $BaF_2$.

A single material or multiple materials may be used for these materials A and B.

Of these materials, it is preferable to use a $ZnS-SiO_2$ mixture. Moreover, insulator materials such as $SiO_2$, ZnS, ZnO, $Si_3N_4$, $Al_2O_2$ and AlN may be used singly.

The height of the structures is preferably 10 nm to 100 nm. When the height is less than 10 nm, signal intensity may be lowered. On the other hand, the signal intensity increases as the structures become higher; however, when it is higher than 100 nm, tracking stability may be degraded.

Meanwhile, a protective layer may be disposed on the convex structures 1304. The silicon compounds such as $Si_3N_4$, $SiO_2$ and SiC or resins having permeability may be used as the protective layer.

Figure 20A:
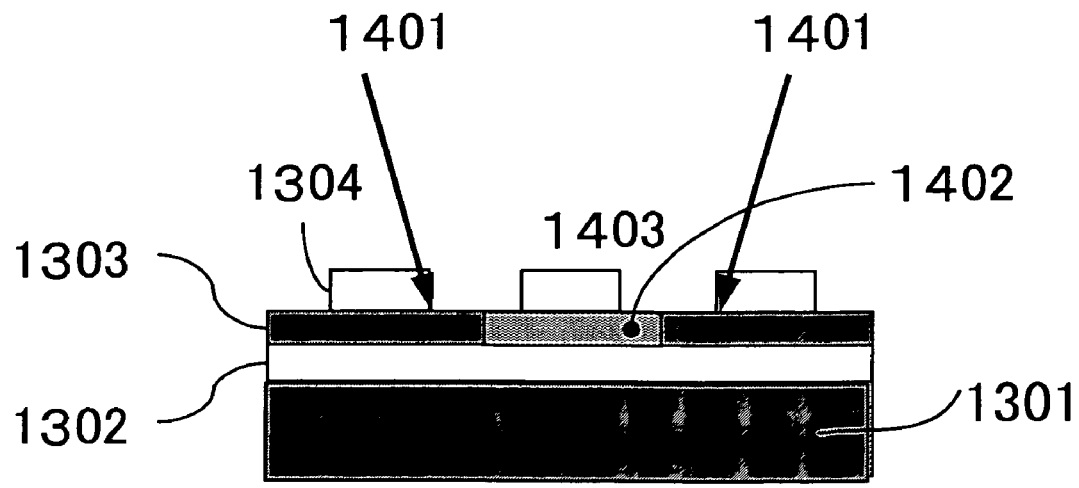
FIG. 20A is an explanatory diagram showing the relation between incoming direction of a laser beam and cross-sectional shape of an medium in an exemplary method for reproducing optical recording medium of the present invention.
Figure 20B:
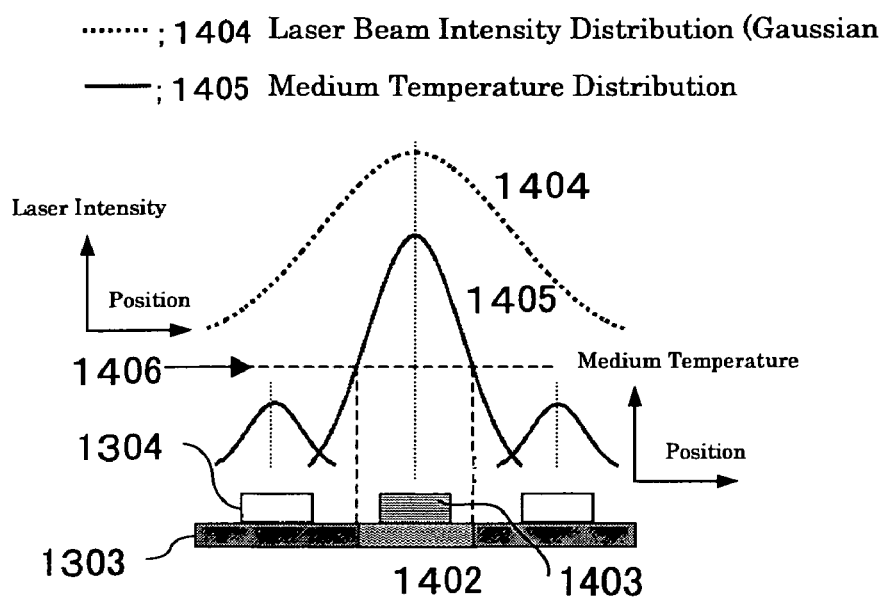
FIG. 20B is an explanatory diagram showing the relation between laser intensity distribution of injected laser beam and temperature distribution on the surface of an optical recording medium in an exemplary method for reproducing optical recording medium of the present invention.

In the method for reproducing of the present invention of the first embodiment, the optical recording medium of the first embodiment is used, and a light is irradiated to a stacked body consisting of the light absorption layer 1303 in the form of thin film, and the convex structures 1304 from the convex structures 1304 side and the changes in reflected light amount is detected. An example of the method for reproducing is shown in FIGS. 20A and 20B. In the first embodiment of the method for reproducing, a laser beam is irradiated from the convex structures 1304 side as shown in FIG. 20A. No. 1401 in FIG. 20A indicates an injection direction of the laser beam. The injected laser beam is absorbed in the light absorption layer 1303 causing the light absorption layer to generate heat. Since the light absorption layer and the convex structures consist of different material, heat values change directly below the convex structures. The optical properties of the light absorption layer changes at a timing of the convex structures with the change in heat value. No. 1403 indicates a structure located in the center of the laser beam and 1402 indicates the region where optical properties of the light absorption layer are changed. The reproduction signal changes at a timing of the convex structures corresponding to the change in optical properties.

FIG. 20B shows a laser intensity distribution 1404 of the injected laser beam and a temperature distribution 1405 of the surface of the optical recording medium. As shown in FIG. 20B, the laser beam intensity distribution 1404 is a Gaussian distribution. No. 1402 in FIG. 20B shows a changed region of optical constant in the light absorption layer.

If the convex structures 1403 are disposed on the medium surface, the temperature distribution corresponds to the convex structures 1403, and the temperature near the convex structures 1403, which are located near the center of the beam, becomes particularly high. As a result, optical properties directly below the convex structures 1403, which are located near the center of the beam, are notably changed. Because the optical constant in a smaller region than the beam diameter which corresponds to the convex structures is 1403 changes, the reproduction signal changes at a timing of the convex structures 1403, even with a cycle at or below the diffraction limit. By the super-resolution reproduction as described above, higher density can be achieved. Meanwhile, No. 1406 indicates a threshold value of the temperature, at which the optical properties of the light absorption layer changes.

<Optical Recording Medium and Method for Reproducing thereof of the Second Embodiment>

The optical recording medium of the present invention of the second embodiment is for the purpose of achieving super-resolution reproduction and higher recording density with a focus effect of the laser beam on the medium.

The optical recording medium of the second embodiment contains a substrate, and a light absorption layer which generates heat by absorbing reproducing light and convex structures, which are in contact with the light absorption layer and contain different material than that of the light absorption layer, on the substrate, and an optical transmission layer having an optical transparency relative to the reproducing light on the convex structures, wherein the optical transmission layer is applied on the surface of the convex structures and is formed in approximate hemispheric form.

Figure 21:
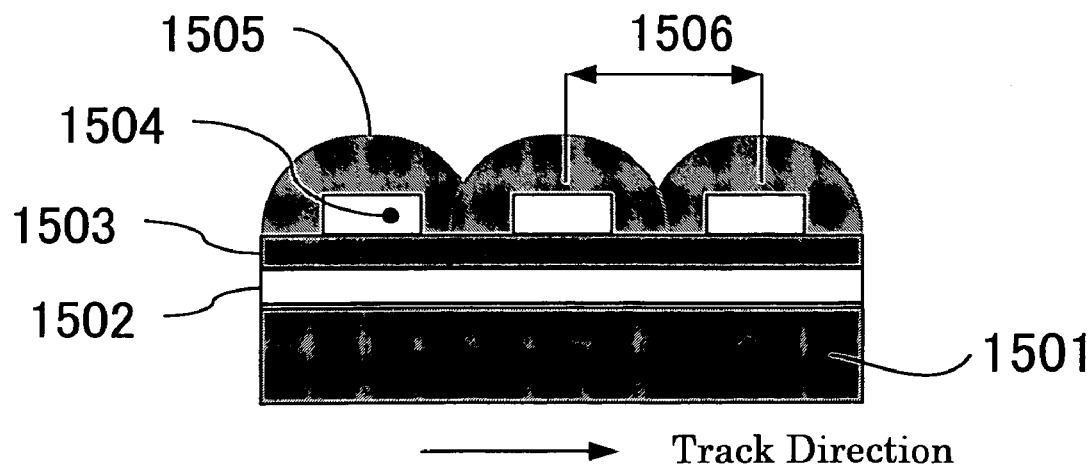
FIG. 21 is an explanatory diagram showing another exemplary optical recording medium of the present invention.

FIG. 21 shows an exemplary composition of the optical recording medium of the second embodiment. The optical recording medium has a buffer layer 1502 in form of thin film for protecting a substrate formed on the substrate 1501, and a light absorption layer 1503 in form of thin film, convex structures 1504 which are in contact with the light absorption layer and an optical transmission layer 1505 are stacked on the buffer layer 1502, wherein the optical transmission layer 1505 is applied on the surface of the convex structures 1504 and its vertical cross-sectional shape is in approximate semi-circular form. Each of the convex structures 1504 is separated on the medium surface as shown in the figure.

The substrate 1501 is formed similarly to the substrate 1301 in the optical recording medium of the first embodiment. The buffer layer 1502 in form of thin film is formed similarly to the buffer layer 1302 in the optical recording medium of the first embodiment and the light absorption layer 1503 in form of thin film is formed similarly to the light absorption layer 1303 in the optical recording medium of the first embodiment.

For the optical transmission layer 1505, oxides, nitrides and fluorine compounds having high transmittance relative to the reproducing light may be used. Examples of oxides include $SiO_2$, $Al_2O_3$, $BiAlO_3$, $BiGeO$, $La_2O_3$, and $LaAO_3$. Examples of nitrides include $Si_3N_4$, AlN and SiON. Examples of fluorine compounds include $CaF_2$ and $BaF_2$.

Meanwhile, the thickness of the optical transmission layer is set according to the height of the structures and it is set at least at or above the height of the structures. If it is less than the height of the structures, it does not form in a semicircular form corresponding to the structures. If it is too thick, longer manufacturing time is needed, leading to cost increase.

Figure 22:
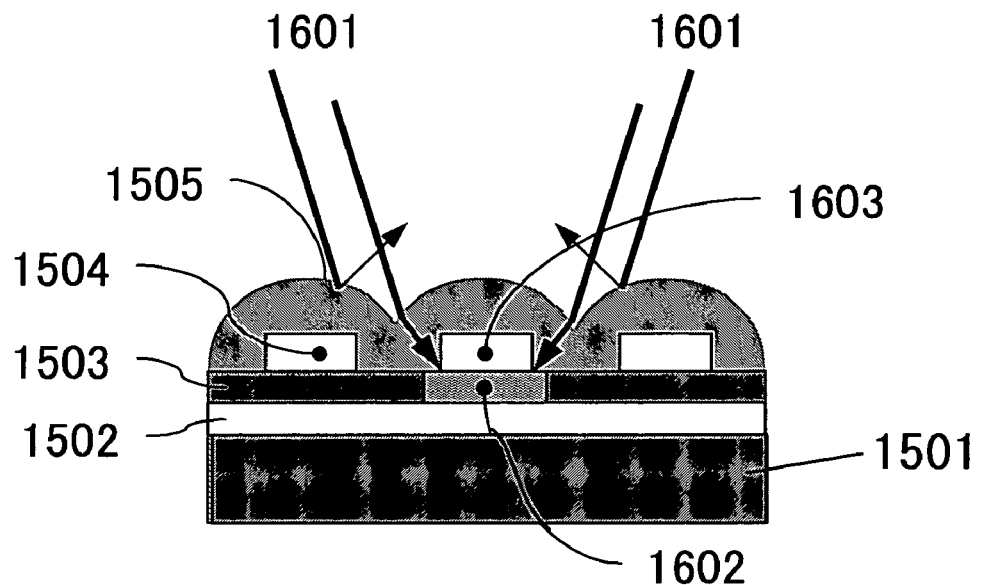
FIG. 22 is an explanatory diagram showing an exemplary method for reproducing optical recording medium of the present invention.

In the method for reproducing of the present invention of the second embodiment, the optical recording medium of the second embodiment is used, and a light is irradiated to a stacked body of the light absorption layer 1503 in form of thin film, the convex structures 1504 and the optical transmission layer 1505 from the optical transmission layer 1505 side and the changes in reflected light amount is detected. FIG. 22 shows an example of the method for reproducing of the second embodiment. In the method for reproducing of the second embodiment, a laser beam is injected from the convex structures 1504 side as shown in FIG. 22. Meanwhile, No. 1601 in FIG. 22 shows an injection direction of the laser beam.

In the method for reproducing of the present invention of the second embodiment, injected laser beam is absorbed in the light absorption layer 1503 causing the light absorption layer 1503 to generate heat. Because the optical transmission layer 1505 in the optical recording medium of the second embodiment is formed in a way so that its vertical cross-sectional shape becomes a semicircular form corresponding to the convex structures 1504, a portion of the laser beam is further focused on the medium surface as shown in the figure. The focused laser beam is absorbed in the light absorption layer 1503 and particularly the light absorption layer near the convex structures 1603 which is located in the center of the beam generates heat. The optical properties such as refractive index and absorption coefficient are changed by heat generation. Meanwhile, No. 1602 indicates a changed region of optical properties in the light absorption layer.

Because the optical transmission layer 1505 with its vertical cross-sectional shape being semicircular is disposed on the optical recording medium of the second embodiment, the focus effect is increased. And the signal intensity from the convex structures 1504 with a cycle at or below the diffusion limit is increased by the super-resolution reproducing effect caused by the changes in optical constant in a smaller region than the beam diameter which corresponds to the convex structures 1504, as similar to the method for reproducing the optical recording medium of the second embodiment.

<Optical Recording Medium and Method for Reproducing thereof of the Third Embodiment>

The optical recording medium of the present invention of the third embodiment is for the purpose of increasing the recording density by multiple-value recording in addition to the purposes of the optical recording media of the first and the second embodiments.

The optical recording medium of the third embodiment is composed as such that the convex structures are in approximate columnar forms and diameter of the convex structure changes according to recorded information. In particular, the convex structures are preferably in approximate columnar form. In order to improve signal quality, the end angle of the convex structure being almost vertical, in other words, being close to cylindrical form is favorable. If the end angle of the structure is gentle, the adjacent structures are connected, thereby degrading signal quality.

Figure 23:
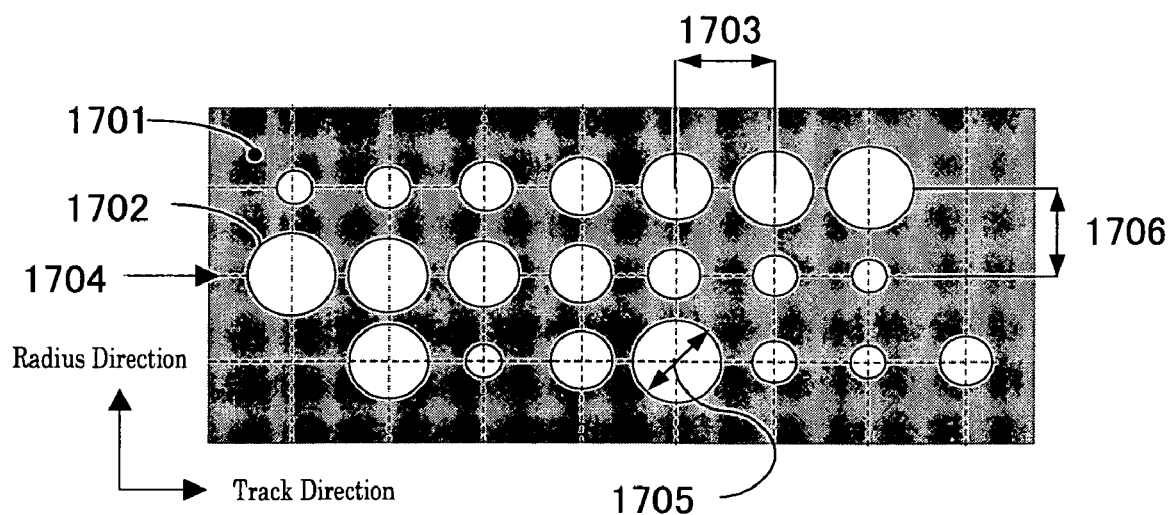
FIG. 23 is an explanatory diagram showing an exemplary optical recording medium of the present invention.

FIG. 23 shows an exemplary top view of the optical recording medium composition of the third embodiment. In FIG. 23, 1701 indicates a light absorption layer, 1702 indicates a convex structure, 1703 indicates a cycle of the convex structures in a track direction, 1704 indicates a recording track and 1705 indicates a diameter of the convex structure.

The stacked composition and the material of each layer of the optical recording medium of the third embodiment are the same as that of the optical recording media of the first and the second embodiments. The convex structures 1702 in the optical recording medium of the third embodiment are in approximate cylindrical form. The cycle of the convex structures 1702 in a track direction is constant. The diameter of the convex structures 1705 changes according to recorded information.

Figure 24A:
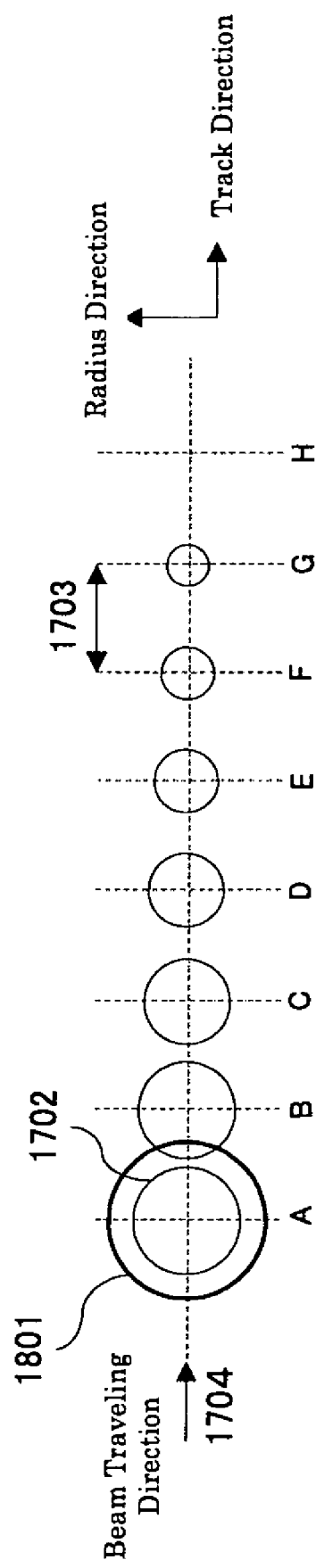
FIG. 24A is an explanatory diagram (top view) showing arrangement of the structures in an exemplary method for reproducing optical recording medium of the present invention.
Figure 24B:
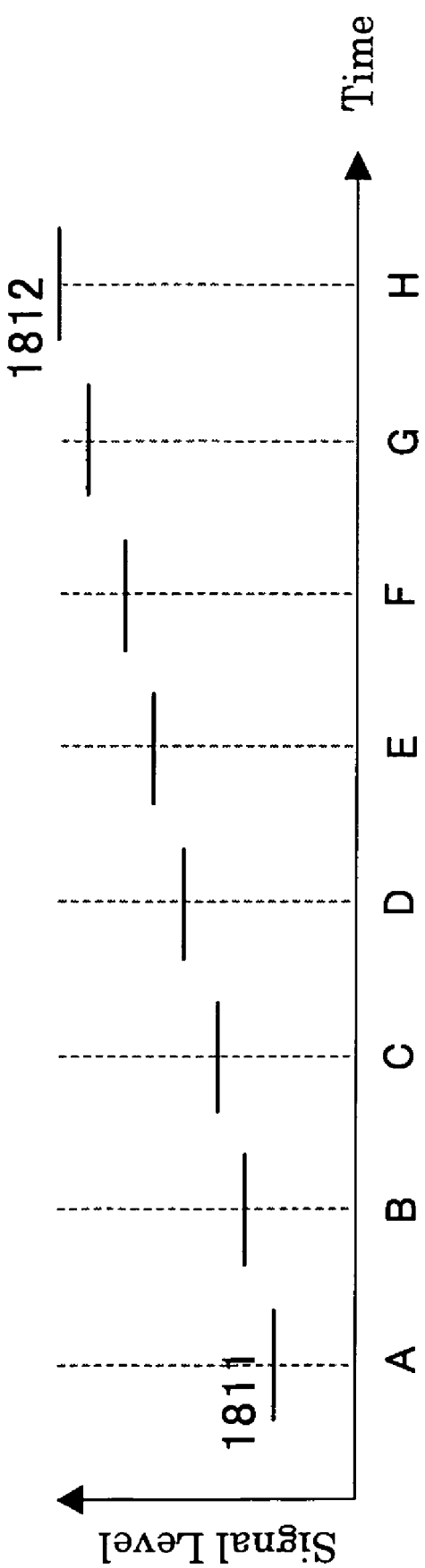
FIG. 24B is an explanatory diagram showing changes in reproduction signal level in an exemplary method for reproducing optical recording medium of the present invention.

In the method for reproducing of the present invention of the third embodiment, the optical recording medium of the third embodiment is used, and a light is irradiated to the convex structures 1702 of which diameters have been changed according to recorded information and the changes in reflected light amount are detected corresponding to the cycle of the convex structures 1702. An example of the method for reproducing the optical recording medium of the third embodiment is shown in FIGS. 24A and 24B. FIG. 24A shows a top view of the optical recording medium and FIG. 24B shows changes in signal level. In FIG. 24A, 1801 indicates a laser beam, 1702 indicates a convex structure, 1703 indicates a cycle of the convex structures and 1704 indicates a track. In FIG. 24B, 1811 indicates a reproduction signal level sampled at a timing A, and 1812 indicates a reproduction signal level sampled at a timing H.

In the method for reproducing the optical recording medium of the third embodiment, a recording is performed by relating the multiple-value information to the changes in diameter of the convex structures. The reflected light amount changes depending on the diameter at a timing when the laser beam is in the center of the convex structures 1702. As shown in figures, multi-value information relating to the changes in diameter can be determined as signal level changes by detecting (sampling) the signal level at a timing of the cycle of the convex structures 1703. As a result, improvement of recording density can be achieved by multiple-value recording.

<Optical Recording Medium and Method for Reproducing thereof of the Fourth Embodiment>

The optical recording medium of the present invention of the fourth embodiment is for the purpose of improving the recording density by smaller track pitches in addition to the purposes of the optical recording media of the first and the second embodiments.

The optical recording medium of the fourth embodiment is composed as such that the convex structures are in approximate columnar form, and the convex structures are in a close-packed arrangement (arranged to trigonal symmetry) on the medium surface in addition to the composition of the optical recording media of the first and the second embodiments. In particular, the convex structures are preferably in approximate cylindrical form. In order to improve signal quality, the end angle of the convex structures being almost vertical, in other words, being close to cylindrical form is favorable. If the end angle of the structure is gentle, the adjacent structures are connected, thereby degrading signal quality.

Figure 25:
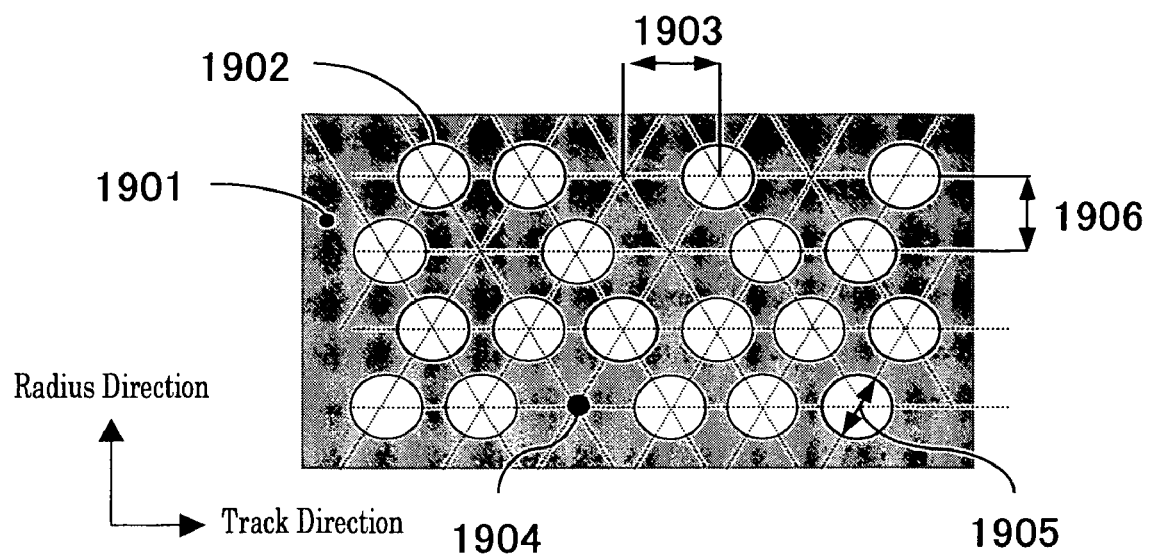
FIG. 25 is an explanatory diagram showing an exemplary optical recording medium of the present invention.

FIG. 25 shows an exemplary top view of the optical recording medium composition of the fourth embodiment. In FIG. 25, 1901 indicates a light absorption layer, 1902 indicates a convex structure, 1903 indicates a cycle of the convex structures in a track direction and 1904 indicates a virtual grid point of close-packed arrangement (arranged to trigonal symmetry).

The stacked composition and the material of each layer of the optical recording medium of the fourth embodiment are similar to those of the optical recording media of the first and the second embodiments. The convex structures 1902 of the optical recording medium of the fourth embodiment are in cylindrical form and have a constant diameter. Moreover, the convex structures 1902 are in close-packed arrangement (arranged to trigonal symmetry). It is composed of grid points with or without the convex structures 1902 according to recorded information.

In the method for reproducing of the present invention of the fourth embodiment, the optical recording medium of the fourth embodiment is used, and a light is irradiated to the convex structures 1902 to reproduce multiple tracks simultaneously and the changes in reflected light amount is detected corresponding to the cycle of the convex structures 1902.

Figure 26A:
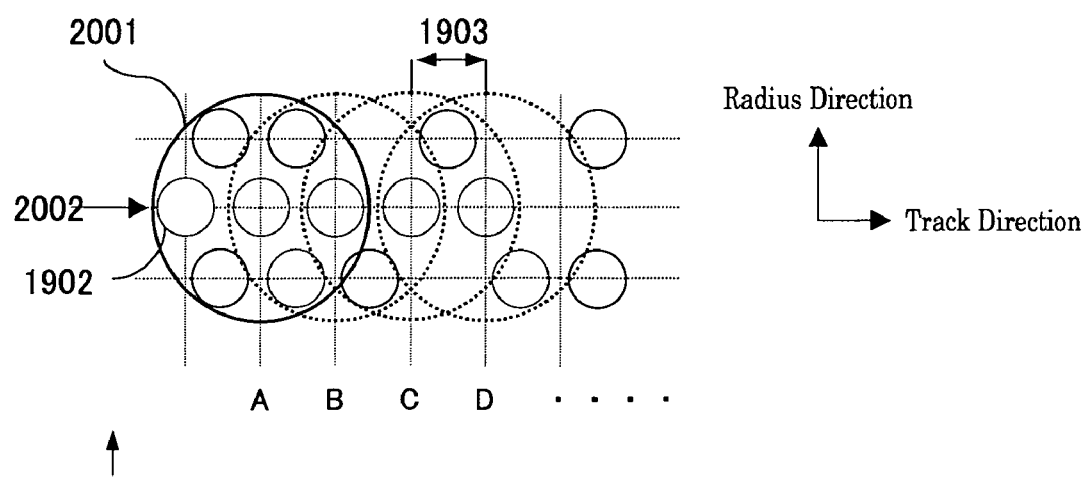
FIG. 26A is an explanatory diagram (top view) showing arrangement of the structures in an exemplary method for reproducing optical recording medium of the present invention.
Figure 26B:
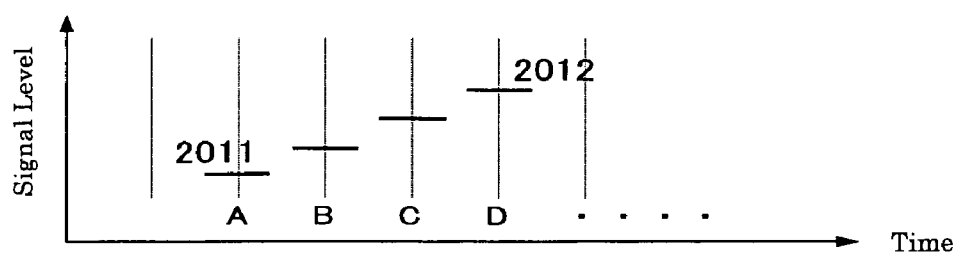
FIG. 26B is an explanatory diagram showing changes in reproduction signal level in an exemplary method for reproducing optical recording medium of the present invention.

FIGS. 26A and 26B show an example of the method for reproducing of the fourth embodiment. FIG. 26A shows a top view of the optical recording medium. In FIG. 26A, 1902 shows a convex structure, 1903 shows a cycle of the convex structure and 2001 shows a laser beam. Meanwhile, FIG. 26A shows convex structures of 3 tracks.

In the method for reproducing of the present invention of the fourth embodiment, the lines of the convex structures in multiple tracks (at least two tracks or more) are reproduced simultaneously. Simultaneous reproduction in here means a plural number of convex structure lines are contained in a beam diameter.

It is preferable to reproduce three lines of the convex structures simultaneously in a radius direction as shown in FIG. 26B. Reproduction signals are detected (sampled) at timings A, B, C, D, etc. of the cycle of the convex structures 1903 in a track direction.

FIG. 26B shows changes in reproduction signal level. In FIG. 26A, 2011 indicates a reproduction signal level sampled at a timing A and 2012 indicates a signal level sampled at a timing D. The number of the structures contained in the laser beam diameter 2001 changes as 7 at timing A, 6 at timing B, 5 at timing C and 4 at timing D. As a result, reflected light amount is changed. When a signal is sampled at a timing of the cycle of the convex structures 703, the beam becomes overlapped in a track direction, detecting one convex structure more than once. By detecting one convex structure more than once, recorded information corresponding to the arrangement and presence or absence of the structures can be determined by using partial response maximum likelihood or PRML. As described above, by arranging the convex structures on the medium surface in close-packed arrangement (arranged to trigonal symmetry) and reproducing plural numbers of structures simultaneously, higher density due to smaller track pitches can be achieved.

<Optical Recording Medium and Method for Reproducing of the Fifth Embodiment>

The optical recording medium of the present invention of the fifth embodiment is for the purpose of reproducing multiple tracks simultaneously with a high degree of accuracy, in addition to the purpose of producing smaller track pitches in the optical recording medium of the fourth embodiment.

In addition to the optical recording medium composition of the fourth embodiment, the lines with no convex structures are disposed every "n" lines (where "n" represents an integer of 2 or more) in a radius direction of the optical recording medium of the fifth embodiment.

Figure 27:
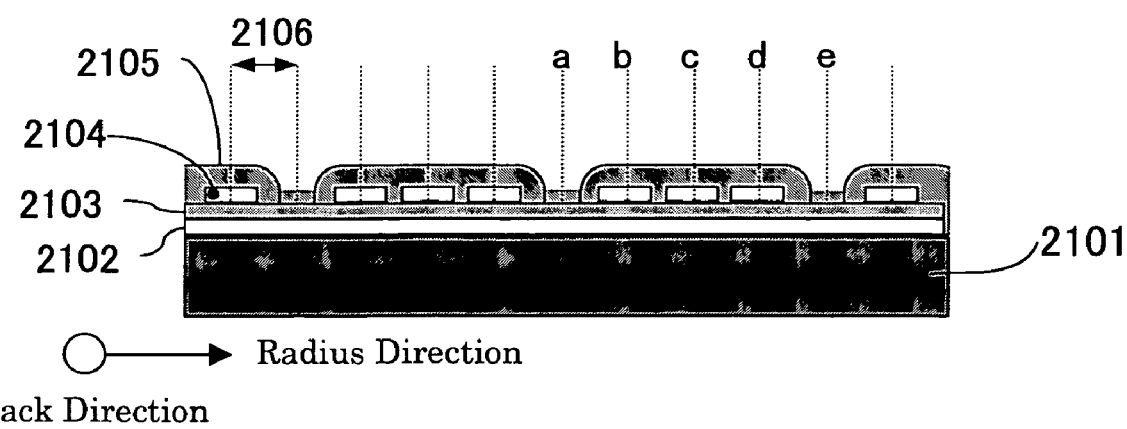
FIG. 27 is an explanatory diagram showing an exemplary optical recording medium of the present invention.

FIG. 27 shows an example of the vertical cross-sectional face in a radius direction of the optical recording medium of the fifth embodiment. In FIG. 27, 2101 indicates a substrate, 2102 indicates a buffer layer, 2103 indicates a light absorption layer, 2104 indicates a convex structure, 2105 indicates an optical transmission layer and 2106 indicates a track pitch.

The convex structures 2104 on the surface of the optical recording medium of the fifth embodiment are arranged in close-packed arrangement (arranged to trigonal symmetry). And the lines without the convex structures 2104 are disposed every "n" lines in a radius direction of the optical recording medium. The lines without the convex structures 2104 are preferably disposed every 4 lines. In tracks a, b, c, d and e as shown in FIG. 27, the convex structures 2104 do not exist in tracks a and e. Therefore, the convex structures 2104 on the surface of the optical recording medium become unevenly dense. As a result, when the optical transmission layer 2105 is formed, regions b, c and d which are dense with the convex structures are covered with the film and grooves are formed in the regions a and e where the convex structures are scarce. With the composition as described above, it is possible to form steps for tracking at a predetermined spots, thereby achieving higher density with smaller track pitches by reproducing plural numbers of the convex structures 2104 simultaneously.

In the method for reproducing of the present invention of the fifth embodiment, the optical recording medium of the fifth embodiment is used, and n−1 lines are reproduced simultaneously and the reflected amount is detected.

Figure 28A:
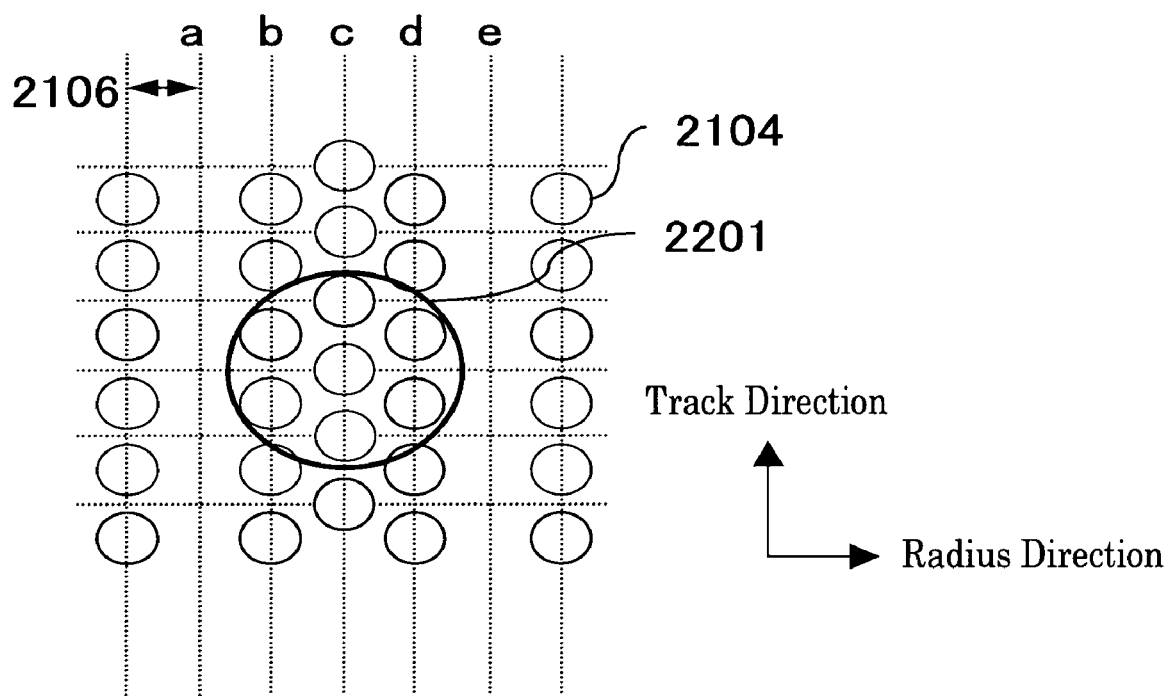
FIG. 28A is an explanatory diagram (top view) showing arrangement of the structures in an exemplary method for reproducing optical recording medium of the present invention.
Figure 28B:
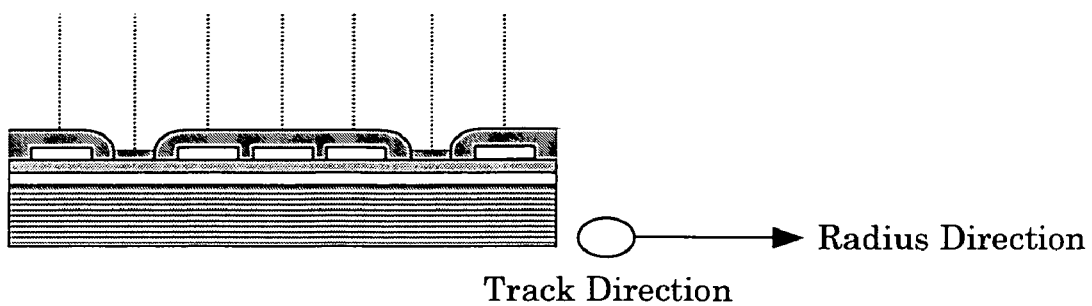
FIG. 28B is a vertical cross-sectional view of the optical recording medium in radius direction in an exemplary method for reproducing optical recording medium of the present invention.

An example of the method for reproducing of the fifth embodiment is shown in FIGS. 28A and 28B. FIG. 28A is a top view of the optical recording medium and FIG. 28B is a vertical cross-sectional view of the optical recording medium in radius direction. In FIG. 28A, 2104 indicates convex structures, 2106 indicates a track pitch and 2201 indicates a laser beam.

In the method for reproducing of the present invention of the fifth embodiment, the convex structures 2104 do not exist in tracks a and e. A push-pull method or differential push-pull method is used as a tracking method. A diffracted light or reflected light from the groove regions a and e is detected by photo diode which is divided in two along the track direction to produce push-pull signal. The push-pull signal is defined as an error signal of tracking servo.

In the method for reproducing of the fifth embodiment, a laser beam can be tracked relative to the convex structure lines b, c and d by producing push-pull signal from the diffracted light or reflected light from convex structure lines a and e to reproduce 3 lines simultaneously. By reproducing plural numbers of structures simultaneously, higher density by smaller track pitches can be achieved.

The method for manufacturing the optical recording medium of the present invention, for example, at least contains laminating in which a stacked body is formed on a substrate by at least laminating a light absorption layer in form of thin film and a thin film material which forms convex structures, recording in which recording of information is performed by irradiating a light to the stacked body from the convex structure side, and convex structure forming in which convex structures are formed by removing unrecorded regions, and further contains other steps as necessary.

The laminating and convex structure forming can be performed according to the method for manufacturing structure.

The method for forming thin films for the stacked body include various vapor growth method such as vacuum deposition, sputtering, plasma CVD, optical CVD, ion plating and electron beam evaporation. Of these, sputtering excels in terms of mass productivity and film quality.

By the method for manufacturing the optical recording medium of the present invention, it is possible to form microscopic convex structures in large area without mask.

EXAMPLES

Herein below, with referring to Examples, the invention is explained in detail and the following Examples should not be construed as limiting the scope of this invention.

Example 1

A medium for forming structure was produced as follow.

The medium for forming structure as shown in FIGS. 1 to 3 was produced. The film-forming method was sputtering. The material and the thickness of each layer, and a principal film-forming condition of sputtering are as shown in Table 1.

Example 2

The medium for forming structure having a composition as shown in FIG. 1 was used. The layer composition consists of glass substrate, Ge and SiON. The film-forming condition of each layer was as shown in Table 1. The structures were formed on the medium for forming structure as follow.

The structures were formed by light irradiation (FIG. 4) followed by etching (FIG. 5).

Figure 16:
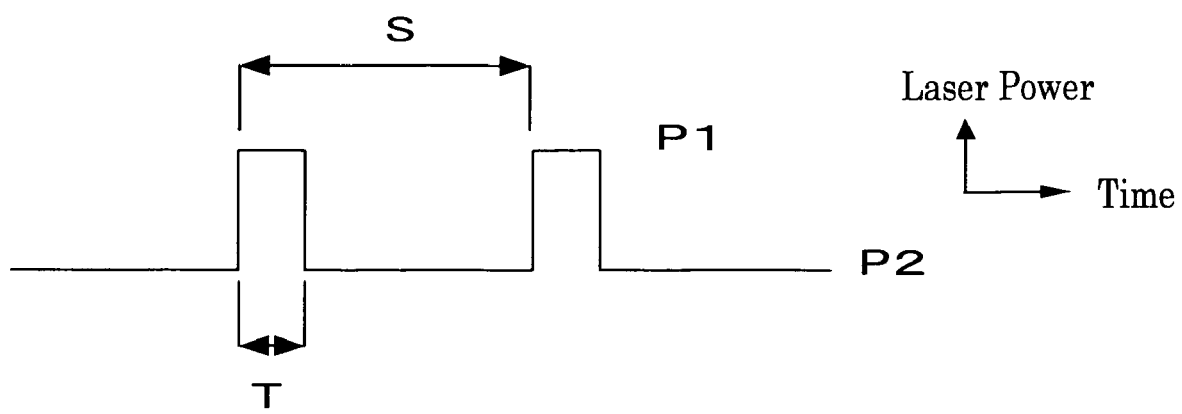
FIG. 16 is a diagram showing an exemplary laser beam modulation method.

A laser beam irradiation apparatus as shown in FIG. 12 was used in light irradiation. The laser beam irradiation apparatus 61 was equipped with a semiconductor laser. The laser wavelength was 405 nm and NA of objective lens was 0.65. A laser beam was irradiated to the medium for forming structure as shown in FIG. 1 from a substrate 103 side. The laser pulse was modulated by a laser modulation unit 62 as shown in FIG. 16. The power level P1 was 10 mW and P2 was 3 mW, the pulse width T was 24 nsec, and the pulse cycle S was 143 nsec. The medium was rotated by a medium rotation unit 64 at a rotating speed of 3.5 m/sec. The cyclic changed regions 202 were formed on SiON as a thermal reaction layer by the above procedures.

Etching was performed by RIE method at a pressure of 1 mTorr and input power of 200 W using an etching gas for oxides, $CF_4$. The regions other than the changed regions by laser irradiation were removed by RIE method to form structures 204.

The structures were formed by the above procedures. The cross-sectional shape of the structures was as shown in FIG. 13. The structures had a cycle of 500 nm and a size (diameter) of 250 nm. The changed regions remained without being etched to form convex structures.

Example 3

The medium for forming structure having a composition as shown in FIG. 2 was used. The layer composition consists of polycarbonate resin substrate, $ZnS$—$SiO_2$, AgInSbTe and $ZnS$—$SiO_2$. The film-forming condition of each layer was as shown in Table 1. The structures were formed on the medium. The light absorption rate of $ZnS$—$SiO_2$ at a laser wavelength of 405 nm was $6\times10^{-4}$.

The structures were formed by light irradiation (FIG. 9) followed by etching (FIG. 10).

A laser beam irradiation apparatus as shown in FIG. 12 was used in light irradiation. The laser beam irradiation apparatus 61 was equipped with a semiconductor laser. The laser wavelength was 405 nm and NA of objective lens was 0.85. A laser beam was irradiated to the surface of the medium for forming structure as shown in FIG. 2 from an uppermost layer, ZnS—

TABLE 1

| Medium Composition | FIG No. | No. | Function | Material | Thickness | Sputtering Target | Atmosphere Gas | Vacuum Degree | RF Input Power |
|---|---|---|---|---|---|---|---|---|---|
| 1 | FIG. 1 | 101 | Thermal Reaction Layer | SiON | 50 nm | Si | $O_2 + N_2$ | 1 m Torr | 1.5 kW |
| | | 102 | Optical Absorption Layer | Ge | 10 nm | Ge | Ar | 1 m Torr | 0.5 kW |
| | | 103 | Supporting Substrate | glass | 0.6 mm | N/A | N/A | N/A | N/A |
| 2 | FIG. 2 | 101 | Thermal Reaction Layer | $ZnS$—$SiO_2$ | 100 nm | $ZnS$—$SiO_2$ | Ar | 1 m Torr | 1.5 kW |
| | | 102 | Optical Absorption Layer | AgInSbTe | 10 nm | AgInSbTe | Ar | 1 m Torr | 0.3 kW |
| | | 101 | Thermal Reaction Layer | $ZnS$—$SiO_2$ | 50 nm | $ZnS$—$SiO_2$ | Ar | 1 m Torr | 1.5 kW |
| | | 103 | Supporting Substrate | polycarbonate | 0.6 mm | N/A | N/A | N/A | N/A |
| 3 | FIG. 3 | 102 | Optical Absorption Layer | SiC | 5 nm | SiC | Ar | 1 m Torr | 1.5 kW |
| | | 101 | Thermal Reaction Layer | $CaF_2$ | 50 nm | $CaF_2$ | Ar | 1 m Torr | 0.3 kW |
| | | 103 | Supporting Substrate | quartz | 0.6 mm | N/A | N/A | N/A | N/A |

SiO$_2$ side. The laser pulse was modulated by a laser modulation unit 62 as shown in FIG. 16. The power level P1 was 4 mW and P2 was 1 mW, the pulse width T was 19 nsec, the pulse cycle S was 114 nsec, and the pulse duty (pulse width/pulse cycle) was 17%. The medium was rotated by a medium rotation unit 64 at a rotating speed of 3.5 m/sec. The cyclic changed regions 302 were formed on ZnS—SiO$_2$ as a thermal reaction layer by irradiating the laser pulse as shown in FIG. 16.

Etching was performed by wet etching method. An etching solution 402 was a hydrofluoric acid (HF) solution (HF: H$_2$O=1:2). The medium was dipped in the HF solution for 10 seconds and structures 403 were formed by etching with HF solution.

Figure 17:
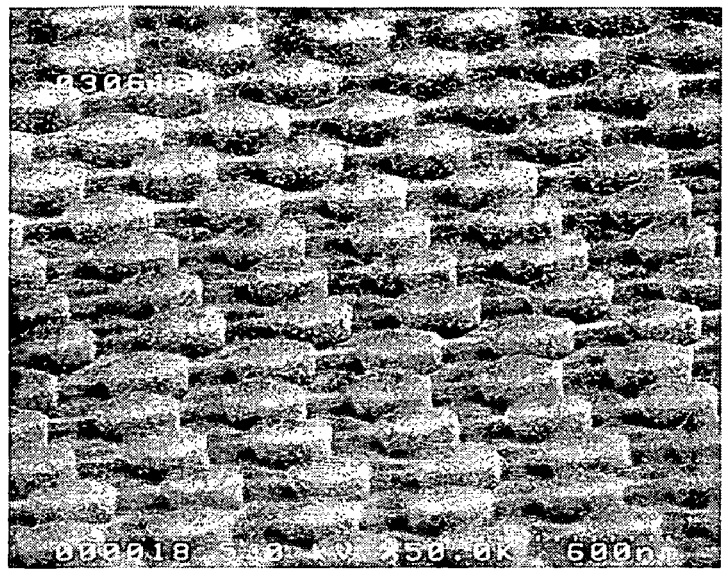
FIG. 17 is a SEM image (perspective view) of the structures of Example 3.

The structures were formed by the above procedures. The shape of the structures was an inverse tapered shape as shown in FIG. 14. The structures had a cycle of 400 nm and a size (diameter) of 250 nm. A SEM image of the formed structures is shown in FIG. 17. The uniformly shaped structures are formed on an medium of large area with a diameter of 12 cm.

Example 4

The medium for forming structure having a composition as shown in FIG. 2 was used. The layer composition consists of polycarbonate resin substrate, ZnS—SiO$_2$, AgInSbTe and ZnS—SiO$_2$. The material, thickness and film-forming condition of each layer are as shown in Table 2. The light absorption rate of ZnS—SiO$_2$ at a laser wavelength of 405 nm was 6×10$^{-4}$.

Figure 18:
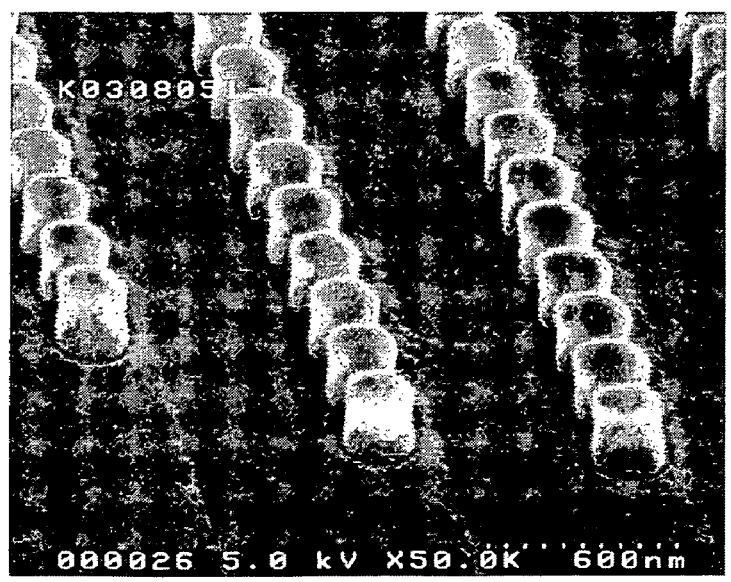
FIG. 18 is a SEM image (perspective view) of the structures of Example 4.

The structures were formed by the above procedures. The cross-sectional shape of the structures was a vertical shape as shown in FIG. 15. The structures had a cycle of 300 nm, a height of 200 nm and a size (diameter) of 200 nm. A SEM image of the formed structures is shown in FIG. 18. The uniformly shaped structures are formed on a medium of large area with a diameter of 12 cm.

Example 5

An optical recording medium having a composition as shown in FIG. 19 was produced.

Polycarbonate was used as a material of a substrate 1301 having a thickness of 0.6 mm.

ZnS—SiO$_2$ was used as a material of a buffer layer 1302 having a thickness of 50 nm. The film forming was performed by sputtering using a sputtering target having a composition of ZnS 80 mol % and SiO$_2$ 20 mol %.

AgInSbTe was used as a material of a light absorption layer 1303 having a thickness of 20 nm. ZnS and SiO$_2$ were contained in the convex structures 1304, and the height of the convex structures from the upper surface of the light absorption layer was 50 nm and a cycle in track direction 1305 was 200 nm.

The method for manufacturing the above optical recording medium will be described referring to FIGS. 9, 10 and 16.

First, each layer was formed in lamination steps as shown in top diagram of FIG. 9. A substrate 101 was made of polycarbonate resin. ZnS—SiO$_2$ was used for a buffer layer 101 having a thickness of 50 nm. The film forming was performed

TABLE 2

| FIG No. | No. | Function | Material | Thickness | Sputtering Target | Atmosphere Gas | Vacuum Degree | RF Input Power |
|---|---|---|---|---|---|---|---|---|
| FIG. 2 | 101 | Thermal Reaction Layer | ZnS—SiO$_2$ | 200 nm | ZnS—SiO$_2$ | Ar | 1 m Torr | 1.5 kW |
|  | 102 | Optical Absorption Layer | AgInSbTe | 10 nm | AgInSbTe | Ar | 1 m Torr | 0.3 kW |
|  | 101 | Thermal Reaction Layer | ZnS—SiO$_2$ | 50 nm | ZnS—SiO$_2$ | Ar | 1 m Torr | 1.5 kW |
|  | 103 | Supporting Substrate | polycarbonate | 0.6 mm | none | none |  |  |

The structures were formed by light irradiation (FIG. 9) followed by etching (FIG. 10).

A laser beam irradiation apparatus as shown in FIG. 12 was used in light irradiation. The laser beam irradiation apparatus 61 was equipped with a semiconductor laser. The laser wavelength was 405 nm and NA of objective lens was 0.85. A laser beam was irradiated to the surface from an uppermost layer, ZnS—SiO$_2$ side. The laser pulse was modulated by a laser modulation unit 62 as shown in FIG. 16. The power level P1 was 5 mW and P2 was 1.4 mW, the pulse width T was 10 nsec, the pulse cycle S was 58 nsec, and the pulse duty (pulse width/pulse cycle) was 17%. The medium was rotated by a medium rotation unit 64 at a rotating speed of 3.5 m/sec. The changed regions 302 were formed on ZnS—SiO$_2$ as a thermal reaction layer by irradiating the laser pulse as shown in FIG. 16.

Etching was performed by wet etching method. An etching solution 402 was a hydrofluoric acid (HF) solution (HF:H$_2$O). The medium was dipped in the HF solution for 10 seconds and structures 403 were formed by etching with HF solution.

by sputtering using a sputtering target having a composition of ZnS 80 mol % and SiO$_2$ 20 mol %. A light absorption layer 103 was made of AgInSbTe with a thickness of 20 nm. A thin film 101, which forms convex structures, was made of ZnS—SiO$_2$ with a thickness of 50 nm. The film forming was performed by sputtering using a sputtering target having a composition of ZnS 80 mol % and SiO$_2$ 20 mol %. The sputtering conditions of each layer include room temperature as a film-forming temperature and argon atmosphere as a film-forming atmosphere.

Next, a laser beam 301 was irradiated from a thin film side, which forms convex structures, to perform recording of information in a recording step as shown in middle diagram of FIG. 9. The wavelength of the laser beam used for recording was 405 nm and the numerical aperture of objective lens was 0.85.

Recording was performed by a laser power modulation as shown in FIG. 16. The power level was modulated at 2 levels, P1=5 mW and P2=0.7 mW. The pulse width T was set at 15 nsec. and pulse cycle S was set at 57 nsec. The pulse duty (pulse width/pulse cycle) was 26%. The single-cycle signals of 200 nm cycle were recorded in these conditions.

FIG. 10 shows an etching step. After recording of information, unrecorded regions of ZnS—SiO$_2$ were removed to form convexity. No. 401 indicates recorded regions of ZnS—SiO$_2$, 402 indicates an etching bath, 403 indicates an etching solution and 404 indicates convex ZnS—SiO$_2$. A mixed solution of hydrofluoric acid (HF) and water (H$_2$O) was used as an etching solution 403. A 50% dilute solution of hydrofluoric acid was used. The solution ratio, HF:H$_2$O was 1:10. The recording medium was dipped in the solution for 10 seconds. It was then washed with water right after etching and dried with dry nitrogen. The optical recording medium with convex structures was produced by the above procedures.

The convex structures of the above optical recording medium were reproduced by a method as shown in FIGS. 20A and 20B using objective lens with a numerical aperture of 0.85, a laser beam of 405 nm wavelength and a reproduction power of 1.5 mW. The resolution limit cycle ($\lambda$/2 NA) of the optical system was 238 nm. The optical recording medium having a composition as shown in FIG. 19 was reproduced by a method as shown in FIGS. 20A and 20B. In other words, a light was irradiated from convex structures side to detect the change in reflected light amount. As a result, a signal of 200 nm cycle, which is a cycle of resolution limit or less, was detected.

Example 6

An optical recording medium having a composition as shown in FIG. 21 was produced.

A polycarbonate resin was used as a material of a substrate 1501 having a thickness of 0.6 mm. ZnS—SiO$_2$ was used as a material of a buffer layer 1502 having a thickness of 50 nm. SbTe was used as a material of a light absorption layer 1503 having a thickness of 20 nm. ZnS and SiO$_2$ were contained in the convex structures 1504, and the height of the convex structures from the upper surface of the light absorption layer was 70 nm and a cycle in track direction 1506 was 200 nm. SiON was used as a material of an optical transmission layer 1505 having a thickness of 150 nm.

The method for manufacturing the above optical recording medium was as follow. The method for manufacturing convex structures was the same as in Example 5. SiON, which is the optical transmission layer 1505, was stacked after preparing convex structures. The film forming was performed by sputtering. The film-forming temperature was set at a room temperature. Si was used as a sputtering target. The film-forming atmosphere was a mixed atmosphere of oxygen and nitrogen.

The convex structures of the above optical recording medium were reproduced by a method as shown in FIG. 22 using objective lens with numerical aperture of 0.85, a laser beam of 405 nm wavelength and a reproduction power of 1.0 mW. The resolution limit cycle ($\lambda$/2 NA) of the optical system was 238 nm. The optical recording medium having a composition as shown in FIG. 21 was reproduced by a method as shown in FIG. 22. In other words, a light was irradiated from the optical transmission layer side to detect the change in reflected light amount. As a result, a signal of 200 nm cycle, which is a cycle of resolution limit or less, was detected.

Example 7

The convex structures in cylindrical form were arranged as shown in FIG. 23 and the optical recording medium having a layer composition made up of the same material as for Example 5 was produced.

A recording cycle in track direction 1703 was set at 250 nm, a track pitch 1706 was set at 320 nm and diameter of convex structures was changed according to recorded information. A maximum diameter 1705 of convex structures was set at 250 nm and diameter was changed by 8 stages including the case with no convex structures.

The convex structures of the above optical recording medium were reproduced by a method as shown in FIGS. 24A and 24B using objective lens with numerical aperture of 0.85, a laser beam of 405 nm wavelength and a reproduction power of 1.5 mW. The resolution limit cycle ($\lambda$/2 NA) of the optical system was 238 nm. FIG. 24A shows mark alignments. No. 1702 indicates a convex structure, 1703 indicates a recording cycle and 1704 indicates a beam traveling direction. FIG. 24B shows changes in reproduction signal level. No. 1811 indicates a signal level sampled at a timing A in FIGS. 24A and 1812 indicates a signal level sampled at a timing H in FIG. 24A. It was possible to detect reproduction signals of which signal levels change by 8 stages according to diameters by sampling signals at a timing of the cycle of convex structures 1703. Multiple value information of 8 value-level was reproduced by the composition and the method for reproducing the above optical recording media.

Example 8

The convex structures in cylindrical form were arranged as shown in FIG. 25 and the optical recording medium having a layer composition made up of the same material as for Example 6 was prepared.

A cycle in track direction 1903 was set at 137 nm, a track pitch 1906 was set at 119 nm and a diameter of convex structures 1905 was set constant at 60 nm. FIG. 26A shows the relation between alignment of convex structures and reproduction signal level. FIG. 27 shows a cross-sectional shape of the medium. FIGS. 26A and 26B are top views of the medium showing the relation between convex structure lines and laser beam diameter.

The tracks (a, e) without convex structures were disposed every 4 tracks as shown in a cross-sectional diagram of the medium in FIG. 27. An optical transmission layer 1205 was stacked to form steps at every 3 tracks. 3 tracks of b, c and d were reproduced simultaneously as shown in FIG. 23. As shown in FIG. 26A, signals were sampled at a timing of a cycle of convex structure 1903. In this case, signal levels changed depending on the numbers of convex structures contained in a beam diameter 2001. FIG. 26B shows changes in signal level. A signal level 2011 indicates a signal level sampled at timing A of FIG. 26A. A signal level 2012 indicates a signal level sampled at timing D of FIG. 26A. There are conditions including from a condition A in which 7 convex structures are contained in the beam diameter to a condition where no convex structures exist (not shown). As a result, reproduction signals of which signal levels change by 14 stages were detected. As described above, by arranging the convex structures on the medium surface in close-packed arrangement (arranged to trigonal symmetry) and reproducing plural numbers of structures simultaneously, higher density due to smaller track pitches can be achieved.

The structures manufactured by the method for manufacturing structure of the present invention are applicable for wide variety of fields including biochips, photonic crystals and element separation material of various electric devices as well as the optical recording medium because microscopic structures having a high aspect ratio (height of structure/size of structure) are uniformly formed on a medium of large area.

What is claimed is:

1. A method for manufacturing an optical recording medium comprising:

irradiating at least a portion of a medium for forming a structure with light so as to change at least a portion of a first thermal reaction layer by heat generation in a light absorption layer; and performing a first etching to etch the medium for forming a structure so as to leave the changed portion in the first thermal reaction layer and to form a plurality of convex structures, wherein the medium for forming a structure comprises:

the light absorption layer; and the first thermal reaction layer, wherein the first thermal reaction layer is disposed on the light absorption layer in order to form the plurality of convex structures, and wherein the first thermal reaction layer comprises a mixture of a material A and a material B, wherein the material A is a silicon compound material and the material B is at least one selected from a sulfide material and a selenide material, and wherein the manufactured optical recording medium comprises:

the light absorption layer; and the plurality of convex structures, wherein the light absorption layer generates heat by light absorption and the plurality of convex structures are disposed on the light absorption layer, wherein the plurality of convex structures are shaped such that edges of a vertical cross section are approximately vertical and such that a horizontal cross section is approximately circular, and wherein the plurality of convex structures comprise a mixture of a material A and a material B, wherein the material A is a silicon compound material and the material B is at least one selected from a sulfide material and a selenide material.

2. The method for manufacturing an optical recording medium according to claim 1, wherein the medium for forming a structure comprises the first thermal reaction layer disposed as an uppermost layer and having a transparency to light absorbed in the light absorption layer, and the light is irradiated from a side of the first thermal reaction layer of the uppermost layer in the irradiating the medium with light.

3. The method for manufacturing an optical recording medium according to claim 1, further comprising, after the first etching, performing a second etching to etch the light absorption layer using the formed plurality of convex structures as a mask.

4. The method for manufacturing an optical recording medium according to claim 1, further comprising, after the first etching, heating the medium for forming a structure, on which the convex structures are formed.

5. The method for manufacturing an optical recording medium according to claim 1, wherein a laser beam having a wavelength of 390 nm to 405 nm is used for irradiating the medium for forming a structure with light.

* * * * *